(12) United States Patent
Pang et al.

(10) Patent No.: US 7,625,008 B2
(45) Date of Patent: Dec. 1, 2009

(54) AIR BAG WITH GROOVE OR RECESS, OPEN OR PARTIALLY COVERED

(75) Inventors: Hyunsok Pang, Rochester Hills, MI (US); Soonsik Kim, Rochester Hills, MI (US); Jeffery S. Coon, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 21 days.

(21) Appl. No.: 11/550,033

(22) Filed: Oct. 17, 2006

(65) Prior Publication Data

US 2007/0108753 A1    May 17, 2007

Related U.S. Application Data

(63) Continuation-in-part of application No. 11/341,791, filed on Jan. 28, 2006, now Pat. No. 7,131,664, and a continuation-in-part of application No. 11/252,426, filed on Oct. 17, 2005, now Pat. No. 7,152,880.

(60) Provisional application No. 60/790,185, filed on Apr. 7, 2006.

(51) Int. Cl.
*B60R 21/16* (2006.01)
(52) U.S. Cl. .................................. 280/743.1; 280/743.2
(58) Field of Classification Search .............. 280/743.1, 280/743.2
See application file for complete search history.

(56) References Cited

U.S. PATENT DOCUMENTS

| | | | |
|---|---|---|---|
| 3,879,057 | A |   | 4/1975 | Kawashima et al. |
| 5,129,675 | A | * | 7/1992 | Wang ...................... 280/743.1 |
| 5,213,361 | A |   | 5/1993 | Satoh et al. |
| 5,997,037 | A |   | 12/1999 | Hill et al. |
| 6,536,800 | B2 | * | 3/2003 | Kumagai et al. .......... 280/743.1 |
| 6,616,184 | B2 |   | 9/2003 | Fischer |
| 7,350,807 | B2 | * | 4/2008 | Schneider et al. ........... 280/732 |
| 2003/0218325 | A1 |   | 11/2003 | Hasebe et al. |

(Continued)

FOREIGN PATENT DOCUMENTS

DE    20218732 U1    3/2003

(Continued)

OTHER PUBLICATIONS

"Split Air Bag", Research Disclosure, Mason Publications, Hampshire, GB, No. 395, Mar. 1997, pp. 191-192, Anonymous.

*Primary Examiner*—Faye M. Fleming
(74) *Attorney, Agent, or Firm*—Markell Seitzman

(57) ABSTRACT

An air bag (100) has an inflatable chamber (101, 301) defined by a main front panel (102, 212) and a pair of side panels (104*a, b;* 224, 226). The air bag (100) has a vertically oriented recessed portion (110, 220) spanning along most of the length of the main panel or a limited section thereof. The recessed portion (110, 220) divides the air bag (100, 210) into two lower lobe portions (112*a, b,* 240, 242) on each side of the recessed portion. Upon inflation an internal tether (180, 250) is attached to the recessed portion and is anchored at or adjacent to the gas inlet passageway thereby limiting forward movement of the recessed portion upon inflation. The air bag is useful as a frontal air bag, particularly a passenger frontal air bag.

18 Claims, 17 Drawing Sheets

U.S. PATENT DOCUMENTS

| | | | |
|---|---|---|---|
| 2003/0230883 A1* | 12/2003 | Heym | 280/743.1 |
| 2004/0155439 A1 | 8/2004 | Hasebe et al. | |
| 2004/0195807 A1 | 10/2004 | Hasebe et al. | |
| 2004/0232681 A1 | 11/2004 | Adomeit | |
| 2005/0110249 A1 | 5/2005 | Hasebe et al. | |
| 2005/0161918 A1 | 7/2005 | Bito | |
| 2005/0212275 A1 | 9/2005 | Hasebe | |
| 2006/0028009 A1 | 2/2006 | Hasebe et al. | |
| 2006/0043707 A1 | 3/2006 | Hasebe et al. | |
| 2006/0066089 A1 | 3/2006 | Hasebe et al. | |
| 2006/0186656 A1 | 8/2006 | Kumagai | |
| 2007/0262572 A1* | 11/2007 | Fischer et al. | 280/730.1 |

FOREIGN PATENT DOCUMENTS

| | | |
|---|---|---|
| EP | 1364838 A2 | 11/2003 |
| EP | 1580083 A2 | 9/2005 |
| GB | 2262919 A * | 7/1993 |
| JP | 0492239 | 10/1991 |
| JP | 10071911 A | 3/1998 |
| JP | 11005505 A | 1/1999 |
| JP | 11321506 A | 11/1999 |
| JP | 2001233157 A | 8/2001 |
| JP | 2005088686 A | 4/2005 |
| JP | 2005162195 A | 6/2005 |
| JP | 2005247118 A | 9/2005 |
| JP | 2005280470 A | 10/2005 |

* cited by examiner

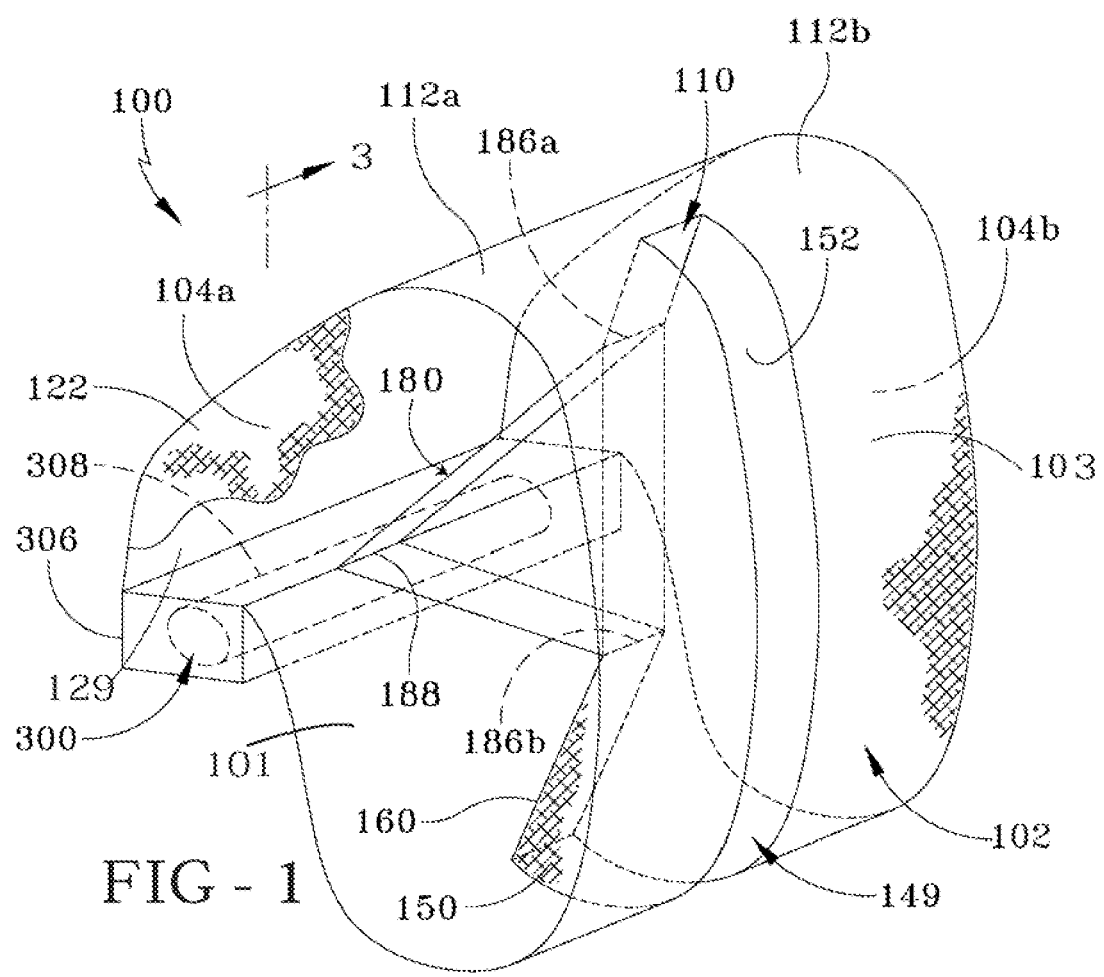
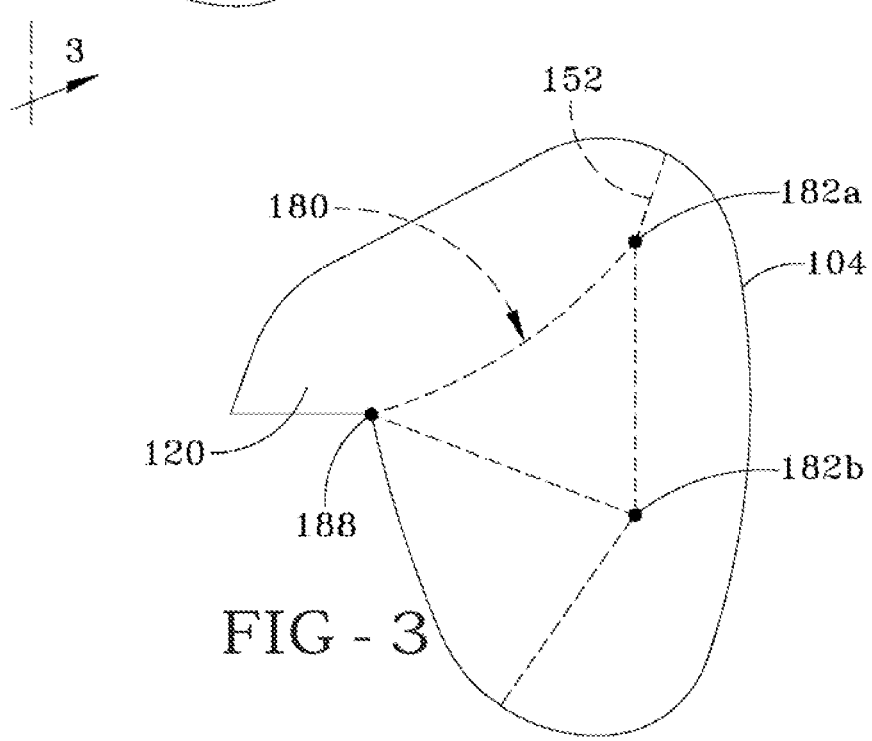

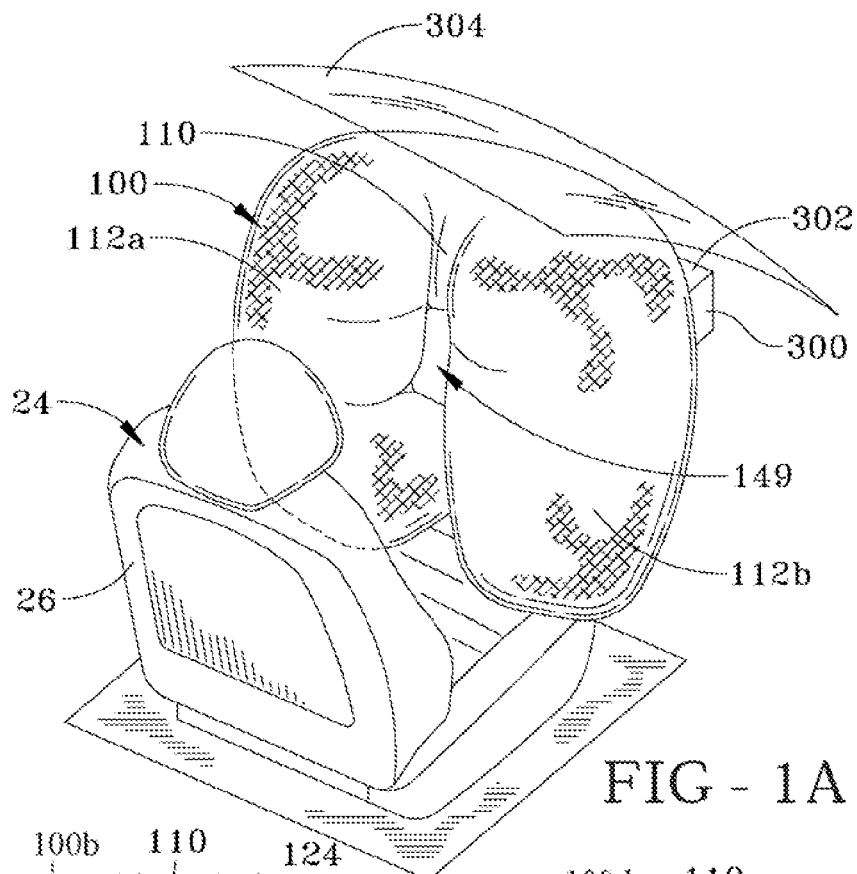
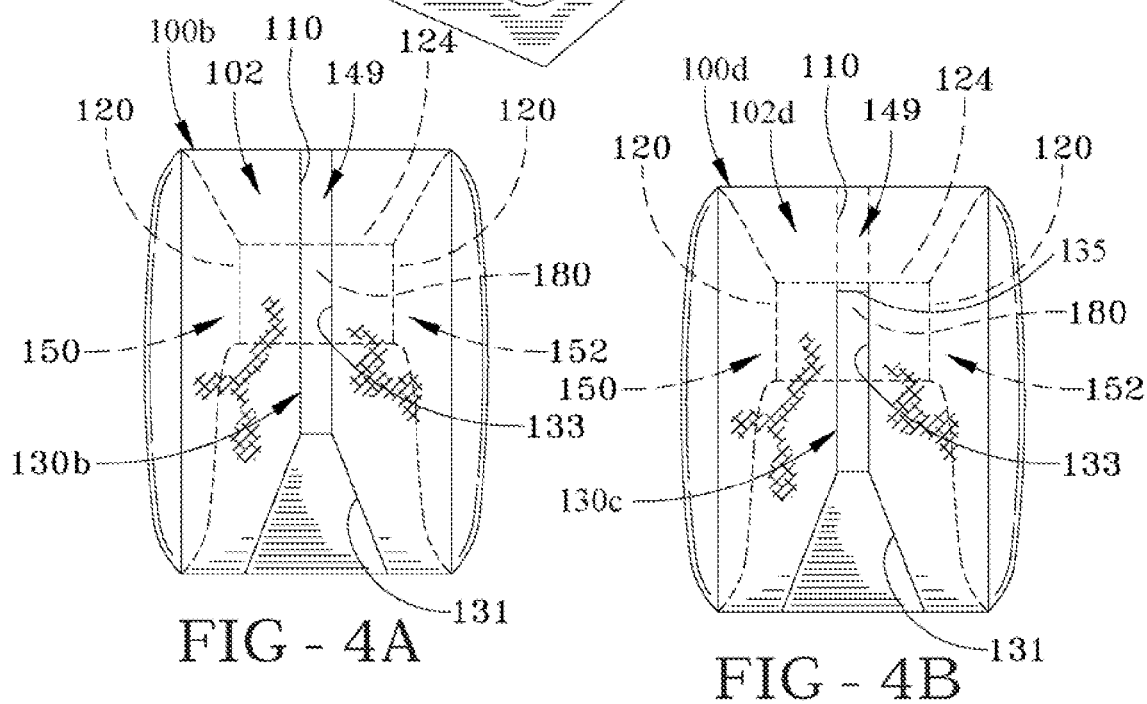

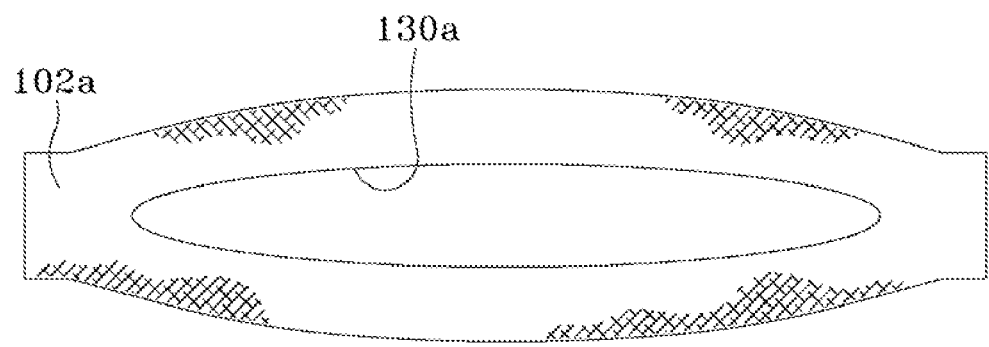
FIG 4
FIG - 5
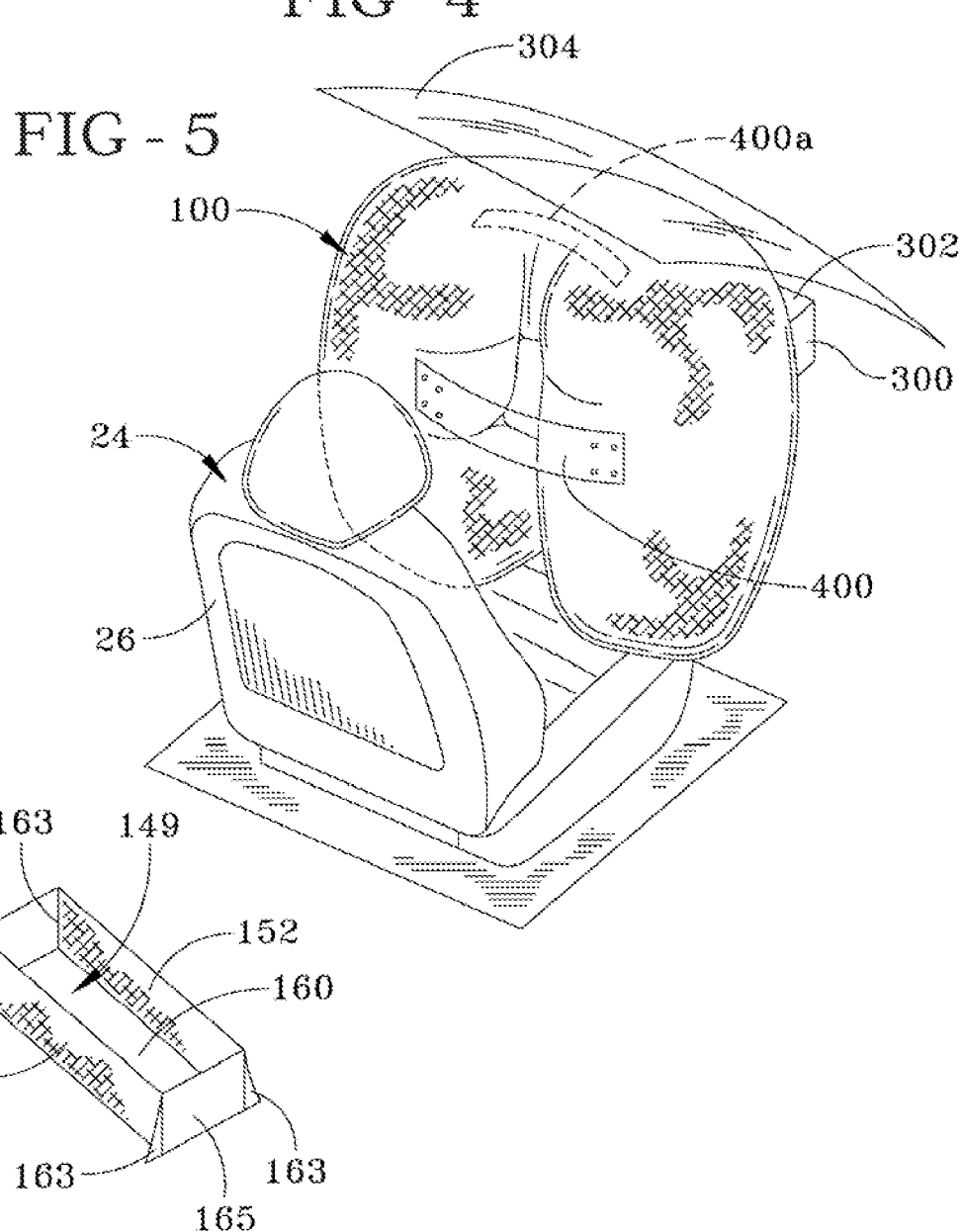
FIG - 6

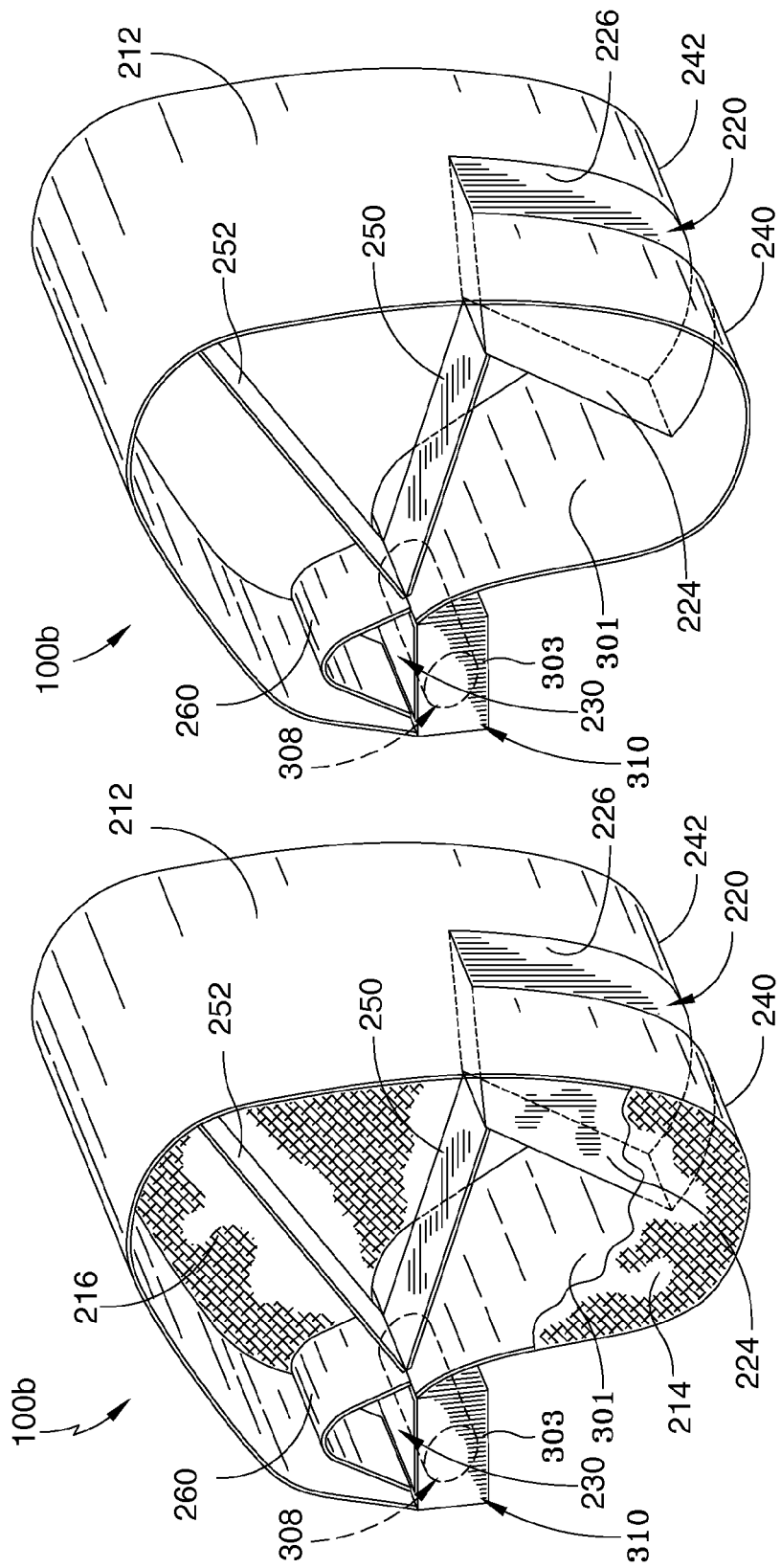

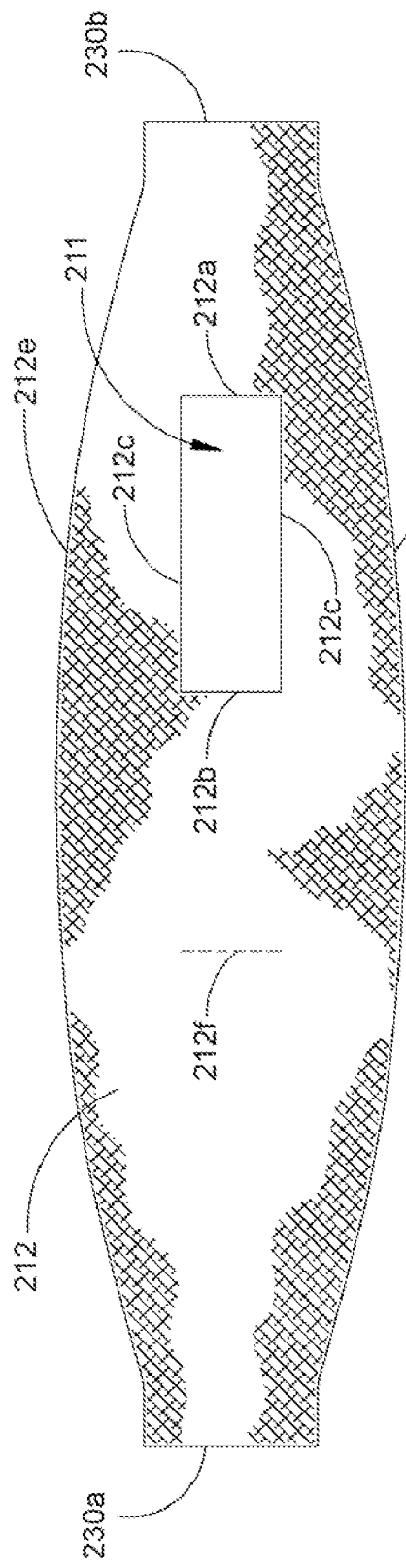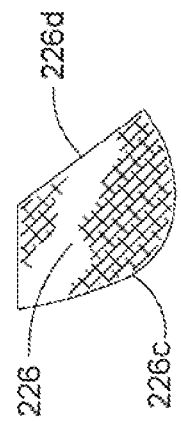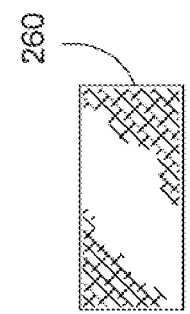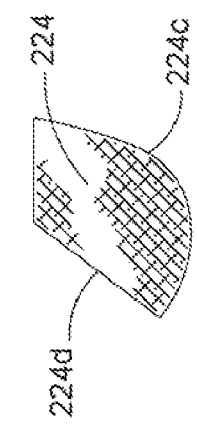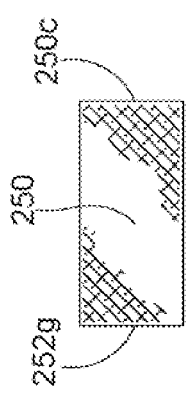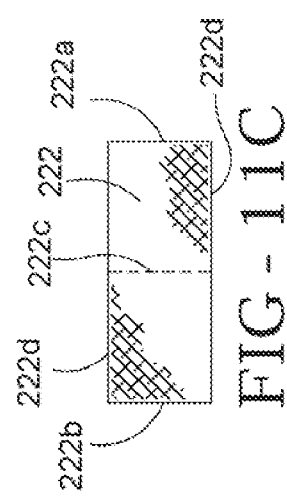

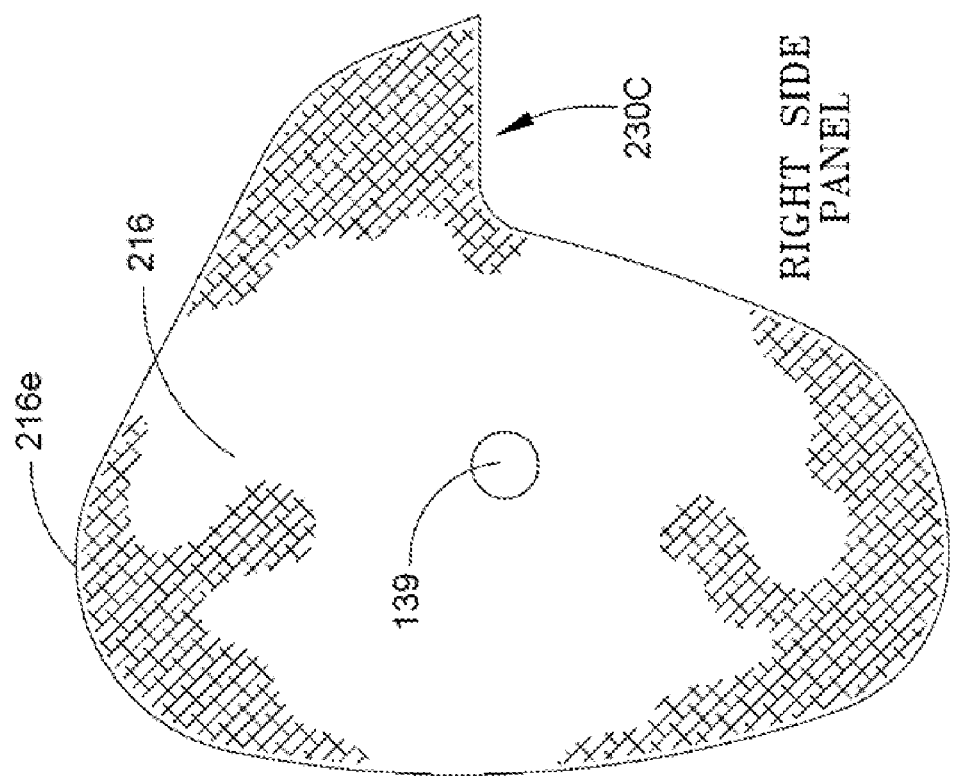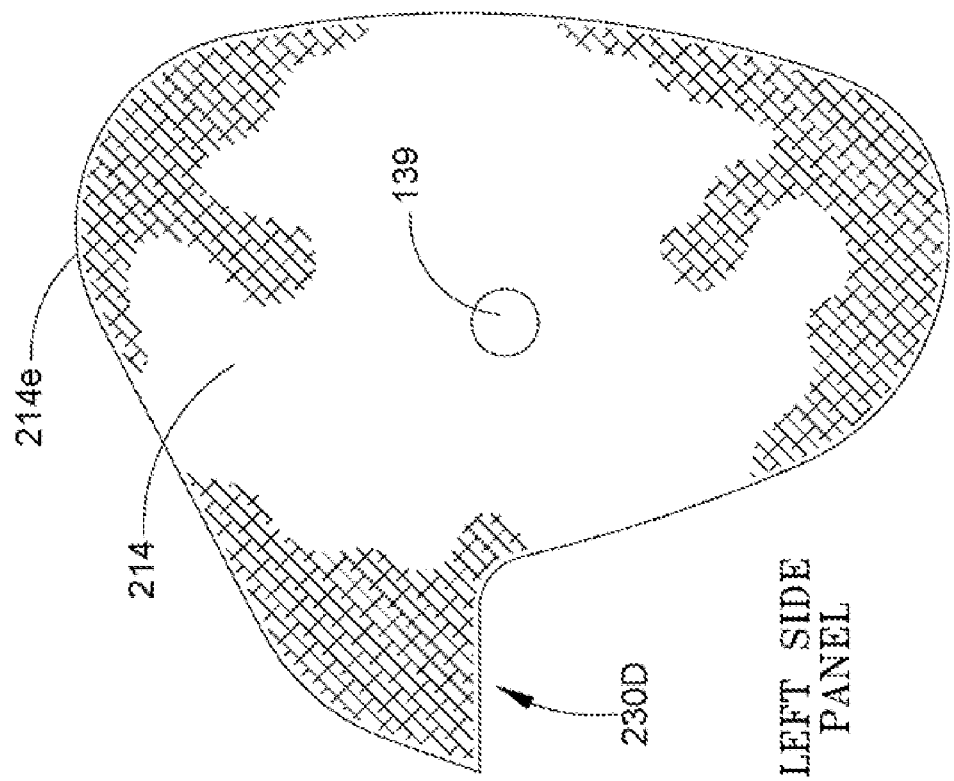
FIG-11B

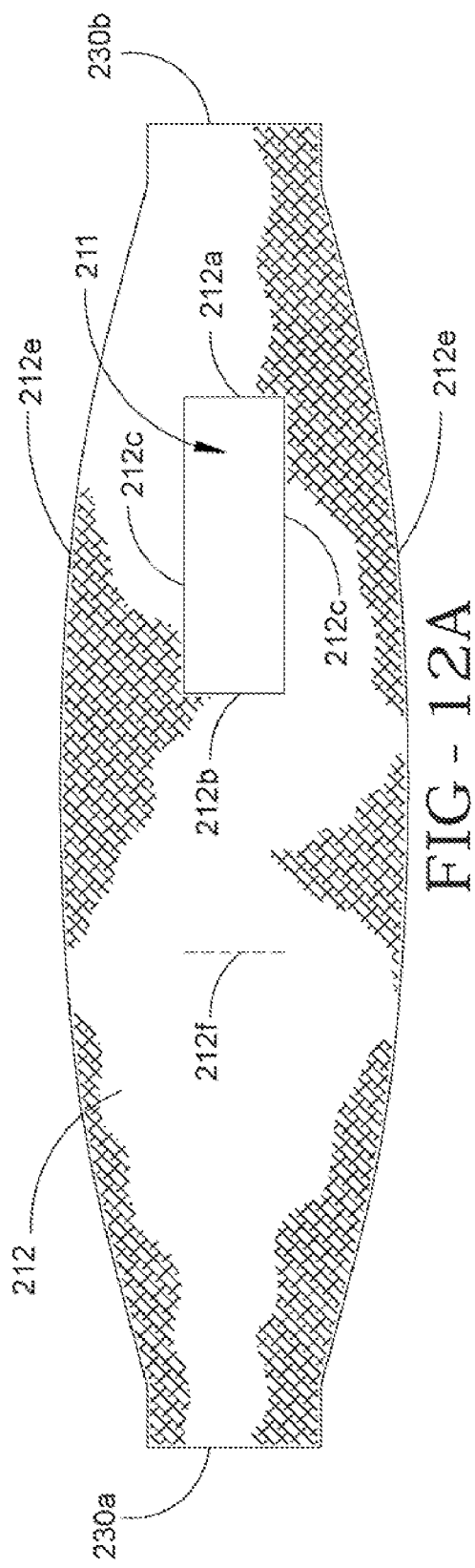
FIG - 12A
FIG - 12C
FIG - 12D
FIG - 12E
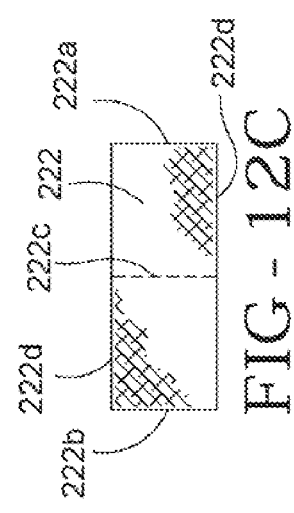
FIG - 12F
FIG - 12G
FIG - 12H

AIR BAG WITH GROOVE OR RECESS, OPEN OR PARTIALLY COVERED

RELATED APPLICATIONS

This application claims the benefit of U.S. Provisional Application 60/790,185, filed on Apr. 7, 2006 and is a Continuation in Part of U.S. patent application Ser. No. 11/252,426 filed on 17 Oct. 2005 entitled "Grooved Air Bag" and Continuation in Part of U.S. patent application Ser. No. 11/341,791 filed Jan. 28, 2006 entitled "Air Bag with a Strategically Placed Recess."

SUMMARY AND BACKGROUND OF THE INVENTION

This invention primarily relates to passenger side air bags deployed from an instrument panel of a vehicle.

As shown in prior art FIG. 13, a conventional passenger side air bag 20 is inflated by an air bag inflator 280. The air bag 20 typically has a single inflatable chamber 330 inflated by gas from the inflator 280. The face portion or front panel 320 of the air bag 20 impacts the vehicle occupant 22 across the chest, shoulders and head. As the vehicle occupant assumes a seated position closer to the vehicle's instrument panel and away from the seat back 26 of the seat 24, the velocity at which the air bag impacts the vehicle occupant increases. If the vehicle occupant's body is on or near the cover of the air bag module at the time of air bag deployment, the level of interaction between the vehicle occupant and the air bag is further elevated.

To reduce injuries to occupants including children, infants in child seats and occupants seated in out-of-position orientation, some newer, more complicated systems propose controlling the rate of air bag inflation by use of various sensors to determine the weight, size or seat location of the occupant to be protected. These sensors are costly and very sophisticated and require a very high degree of reliability to insure they function over the life of a vehicle.

To date none of the systems commonly used can accommodate the deployment of an air bag towards an infant in an infant seat located upon the front seat of a vehicle and facing the rear of a vehicle. Accordingly all vehicle manufacturers provide warnings against such a use of the child seat or alternately provide a means for manually deactivating the air bag.

With reference to prior art FIG. 14, it has been proposed that an inflatable cushion or air bag can be formed with two air bags 21a and 21b, which when inflated are spaced apart (see numeral 360) from each other. When these air bags are inflated, they will take the shape shown in which the space 360 is positioned in front of the normally seated vehicle occupant 22, thereby avoiding contact with the vehicle occupant's head. The air bag-occupant loading is primarily by the two air bags against the right and left sides of the vehicle occupant's torso and the right and left shoulders of the vehicle occupant 20. The use of the above system leads to high loads being created against the out-of-position occupant.

In the United States of America, the National Highway Transportation Safety Administration test criteria of a 1-year-old, a 3-year-old, a 6-year-old; a 105 pound female ($5^{th}$ percentile) are each considered sufficiently different to warrant separated criteria for air bag deployment beyond that of a normal size and weight adult vehicle occupant. Similarly, pregnant women have unique requirements to insure survivability of the infant they are carrying. These and other factors make the design and construction of such safety devices very complex while no other device, other than the seat belt, is credited with saving more lives and minimizing the occurrence of serious injury.

It is a primary objective of the vehicle occupant safety restraints industry to provide vehicle occupant restraint devices with a maximum range of safety for the greatest number of potential uses at the highest possible reliability while still being affordably priced. In science and engineering a constant truth is that "simplicity leads to reliability." The trend toward complex sensors and controls increases the number of components, which inherently leads to increasing the risk of a component malfunction that reduces the overall reliability. To avoid this problem engineers are forced to design in redundancy, which further drives up cost.

SUMMARY OF THE INVENTION

Generally the present patent application discloses a number of major variations of the invention. FIGS. 1-6 show an air bag having a single inflatable chamber configured with a vertically oriented recessed or grooved portion that runs substantially from the top to the bottom of that portion of the air bag facing the occupant to be protected. In this embodiment, the main panel of the air bag includes a long slot or opening forming the entrance, opening or mouth of the groove or space. FIGS. 1C, 1D, 1E, 8A and 11A illustrate another embodiment utilizing a similar construction to achieve the groove of about the same size. The opening in the main panel is reduced in size, and upon assembly a portion of the main panel covers a top of the groove. In a broad sense the covering portion of the main panel provides a bridge that extends over the top portion of the groove. FIG. 4A shows the use of a trapezoidally shaped groove. In FIG. 4B this variation uses a portion of the main panel to cover the top of the groove. In other embodiments of the invention, as illustrated in FIGS. 7 through 12, the groove is foreshortened and extends generally from the middle of the main panel to the lower portions of the air bag; however, in these embodiments this shortened groove (with a correspondingly smaller opening in the main panel) does not extend under the main panel as in the embodiments shown, for example, in FIGS. 1A and 2A. As before, a simple inflatable chamber is used in all of the disclosed embodiments.

The present invention provides an air bag that can meet the Federally mandated requirements and test criteria for a 1-year-old infant, a 3-year-old, a 6-year-old and a $5^{th}$ percentile woman while still meeting the design standards for a $50^{th}$ percentile adult passenger without the use of exotic sensing systems and computerized algorithms.

An air bag system according to the present invention can perform without requiring vehicle occupant weight or position sensors.

The air bag design of the present invention is such that it achieves an inherent very high reliability without any significant cost penalty.

BRIEF DESCRIPTION OF THE DRAWINGS

FIG. 1 is a diagrammatic view of an inflated air bag showing the invention of the Grooved Air Bag of U.S. patent application Ser. No. 11/252,426.

FIG. 1A is an isometric view of the air bag of FIG. 1 shown inflated in relation to a vehicle's windshield and seat. The right-side panel is partially removed to show the interior of the air bag.

FIG. 3 is a side plan view illustrating one of the side panels of the air bag of FIG. 1, as well as a center panel of a groove forming structure and a tether shown by phantom lines.

FIG. 4 shows an alternative version of the air bag of FIG. 1.

FIG. 4A shows another alternative of the air bag of FIG. 1 with a trapezoidally shaped groove.

FIG. 4B shows another alternate of an air bag with a trapezoidally shaped groove.

FIG. 5 shows a further alternative of the air bag of FIG. 1.

FIG. 6 shows still another alternative of the air bag of FIG. 1.

FIG. 10 is a perspective view of the air bag of FIG. 7 with most of the left side panel removed to show the internal tethers and diffuser components.

FIG. 11 is the perspective view of FIG. 10 with both side panels removed.

FIGS. 11A through 11H are plan views of the various air bag components shown prior to being sewn together.

FIGS. 12A through 12H are plan views of an alternative embodiment of the air bag showing the panels and other components in plan view prior to assembly wherein the recess side panels and tethers are modified from the embodiment shown in FIGS. 11A through 11H.

DETAILED DESCRIPTION OF THE INVENTION

Figure 1B:
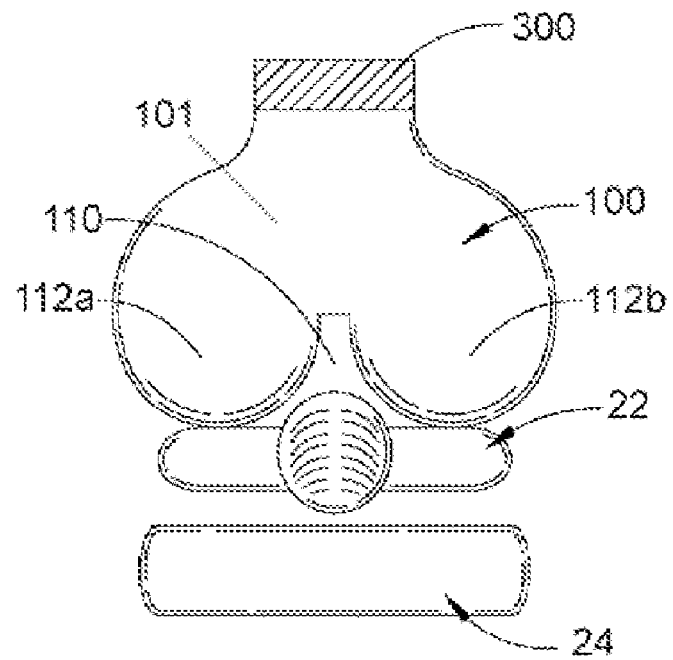
FIG. 1B is a top plan view of the air bag of FIG. 1.

The air bag shown in various figures has a single chamber 101 and in general can be formed by one or more panels of fabric. The air bag can be woven or knitted as a one-piece construction or formed by sewing or bonding a plurality of panels together. A groove 110 is formed behind the panel or portion of the air bag facing the occupant to be protected. In the illustrated embodiment, air bag 100 includes a main panel 102 having a face panel portion 103, which faces the vehicle occupant to be protected, and a plurality of side panels 104a, 104b. As can be appreciated the size of the air bag and its various panels will change in each vehicular application. Further, as can be appreciated it is not necessary to form the air bag with separate side panels and a linking main (or center) panel. Each of these panels is typically made from woven fabric comprising nylon or polyester. The side panels 104a, 104b are substantially identical and are the mirror image of each other. Each of the side panels 104a, 104b includes a neck portion 120 configured to communicated with an inflator and a cushion portion 122. The main panel generally includes a top or end or upper portion, a middle portion and a lower or end or bottom portion.

Figure 15:
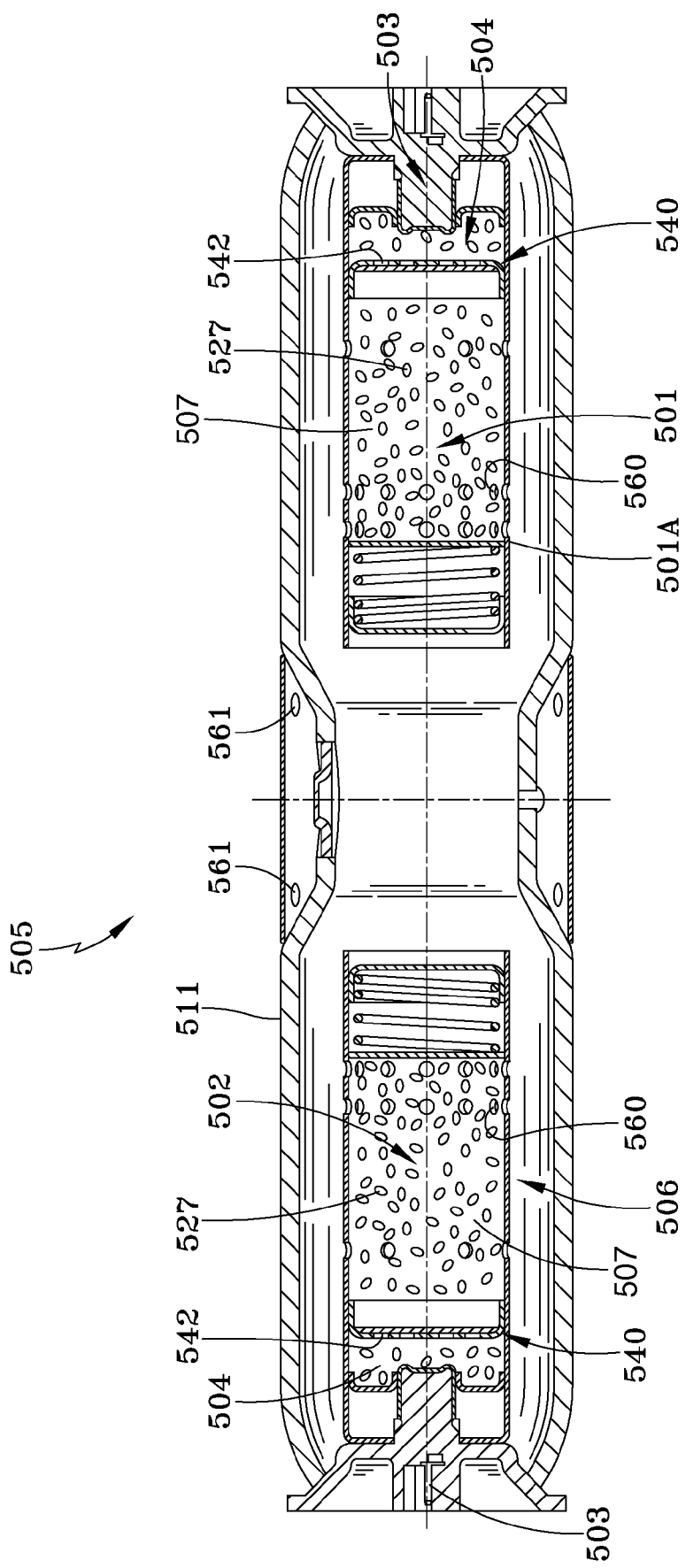
FIG. 15 is a cross-sectional view of an exemplary inflator that can be used in combination with the air bag of the present invention.

More particularly, the main panel has a pair of opposing neck portions 124 located at the ends of the main panel. The various neck portions are joined together to form the neck or inlet of the air bag, which is communicated to an inflator or to a housing in a known manner. The middle or cushion portion 126 of the main panel 102 is located generally in the center of the main panel, a part of the center portion of which faces the occupant and forms the face panel portion 103. The center portion 126, in the vicinity of the face panel portion 103, includes an opening 130, which as will be described below is used to form a recess and more specifically the opening to the recess in the inflated air bag 100. The air bag 100 is formed by sewing an edge 132 of the side panel 104a to an edge 134 of the main panel 102. Similarly, an edge 132 of the other side panel 104b is sewn to an edge 134a of the main panel 102 in a known manner providing the air bag 100 with its general shape. The inflatable chamber 301 has an opening, passage or neck 129 formed by the ends or neck portions of the main panel cooperating with the side panels that allows inflation gas to enter the inflatable chamber 301 and inflate the air bag 100. Upon attachment of the various panels, an inflator 308 (shown in FIGS. 1 and 15) is positioned within the neck of the air bag. Prior to inflation, the air bag is folded and stored in a housing 306 of an air bag module 300 of which the air bag 100 is a part.

The width of the groove 110 in the inflated air bag is about at least 25% of the width of the front portion of the main panel 212, preferably between 25% and 35% of the overall width. In general, this may be in the range of about 120-250 mm. The overall length of the recess can be varied between 85% and 90% of the overall air bag height typically in about 1500-1600 mm.

Figure 1D:
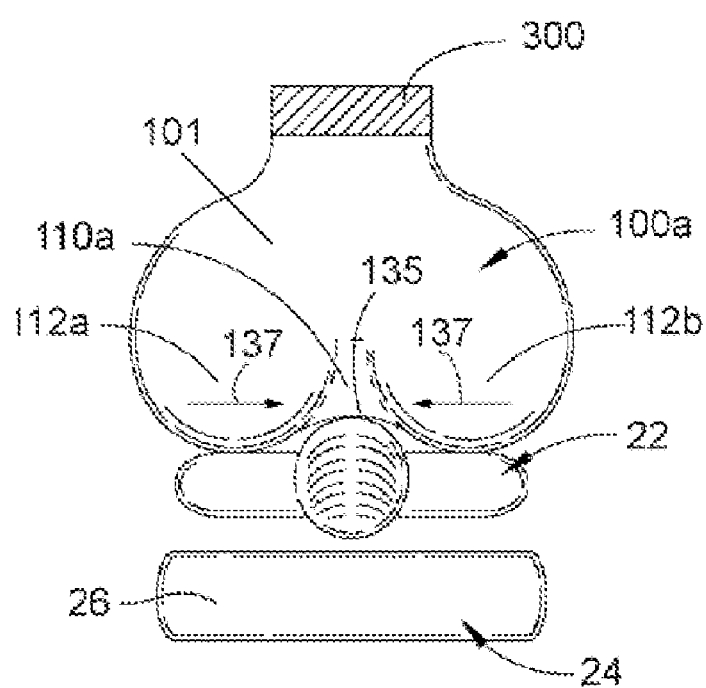
FIG. 1D is a top view of the air bag of FIG. 1C.
Figure 1C:
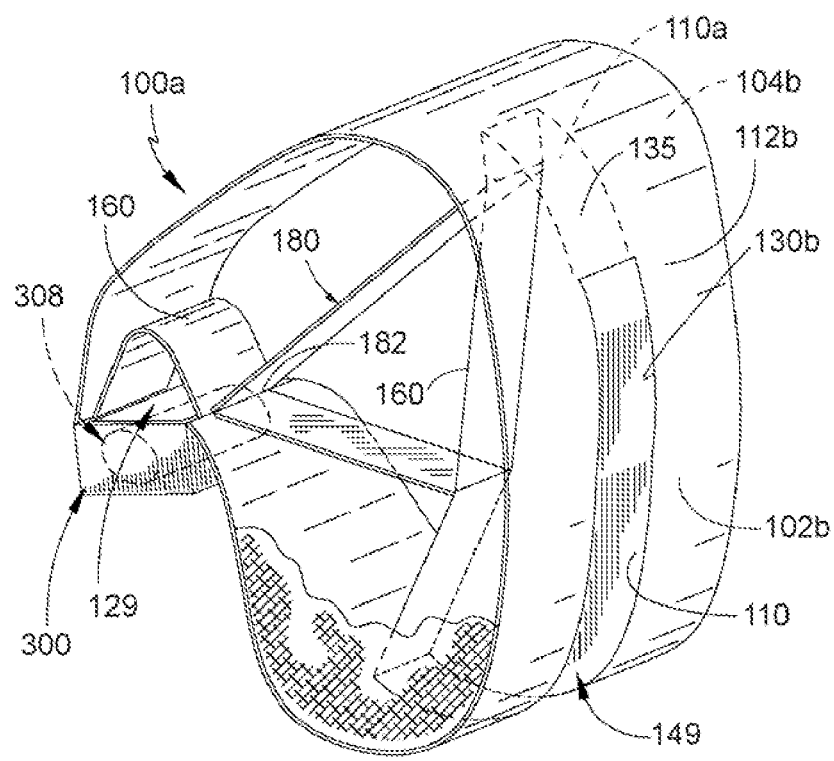
FIG. 1C is an isometric view of an alternative air bag; part of the right-side panel has been removed.

Opening 130 in the main panel 102 has one (if for example formed as a continuous shape) or more edges 140a, 140b, 140c, and 140d. Even though the opening 130 is shown as rectangular in shape, the opening 130 can take on other forms including oblong, as shown in FIG. 4, which shows an alternate main panel 102a with an oval opening 130a. The opening in the face panel portion can be a hybrid shape. See, for example, opening 130a of FIG. 4A uses a groove 110 formed as a combination of trapezoidal or triangular 131 and rectangular 133. The trapezoidal shape, with its larger opening, located toward the bottom of the bag, helps to minimize interference with a child or small adult in an out-of-position seating position with their head or chest on or very close to the cover of the air bag module. FIG. 2B shows the layout of the various panels useful in making the air bag in FIG. 4A and is also useful in understanding the construction of the bag shown in FIG. 4B. In FIG. 2B the top 140a of the rectangular portion 133 of opening 130c is positioned toward the top of panel 102d so that the groove can run from the top to the bottom of the face portion of the bag, as was the case with the earlier embodiments. FIG. 2B also shows a dotted line 140'a, which shows the location of the top of the opening 130c for use with the air bag in FIG. 4B in which the upper portion 135 of the main panel 102d covers the top portions of the slot 110. Here, as in the embodiment shown in FIG. 1C, the top portion of the main panel bridges the lobes 112a and 112b.

Figure 1E:
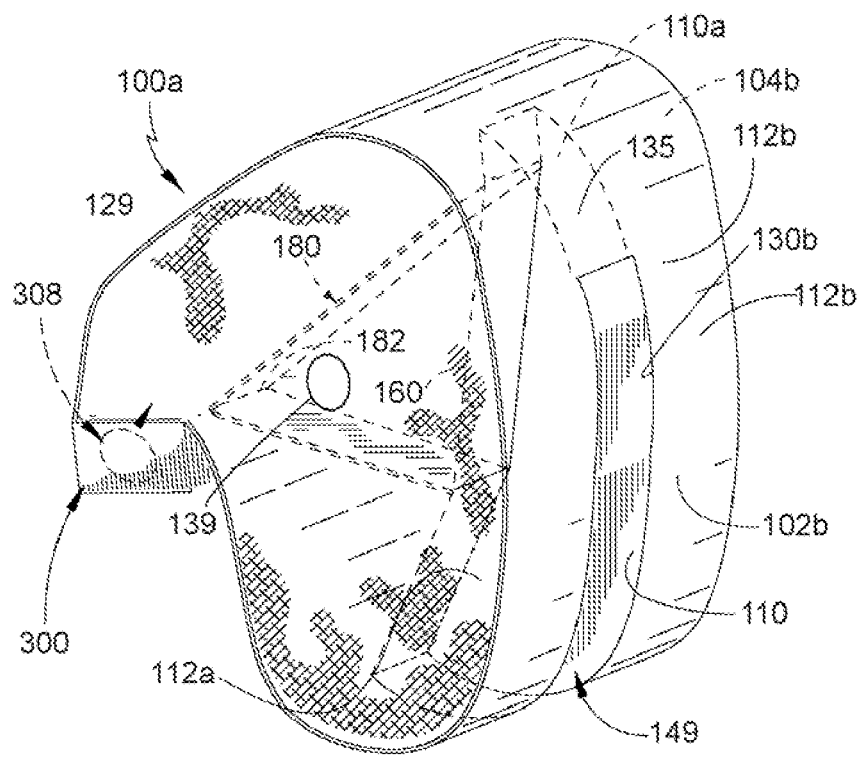
FIG. 1E is another isometric view of the air bag of FIG. 1C having a complete right-side panel and this figure also shows the use of an optional vent located in one or both side panels.
Figure 2:
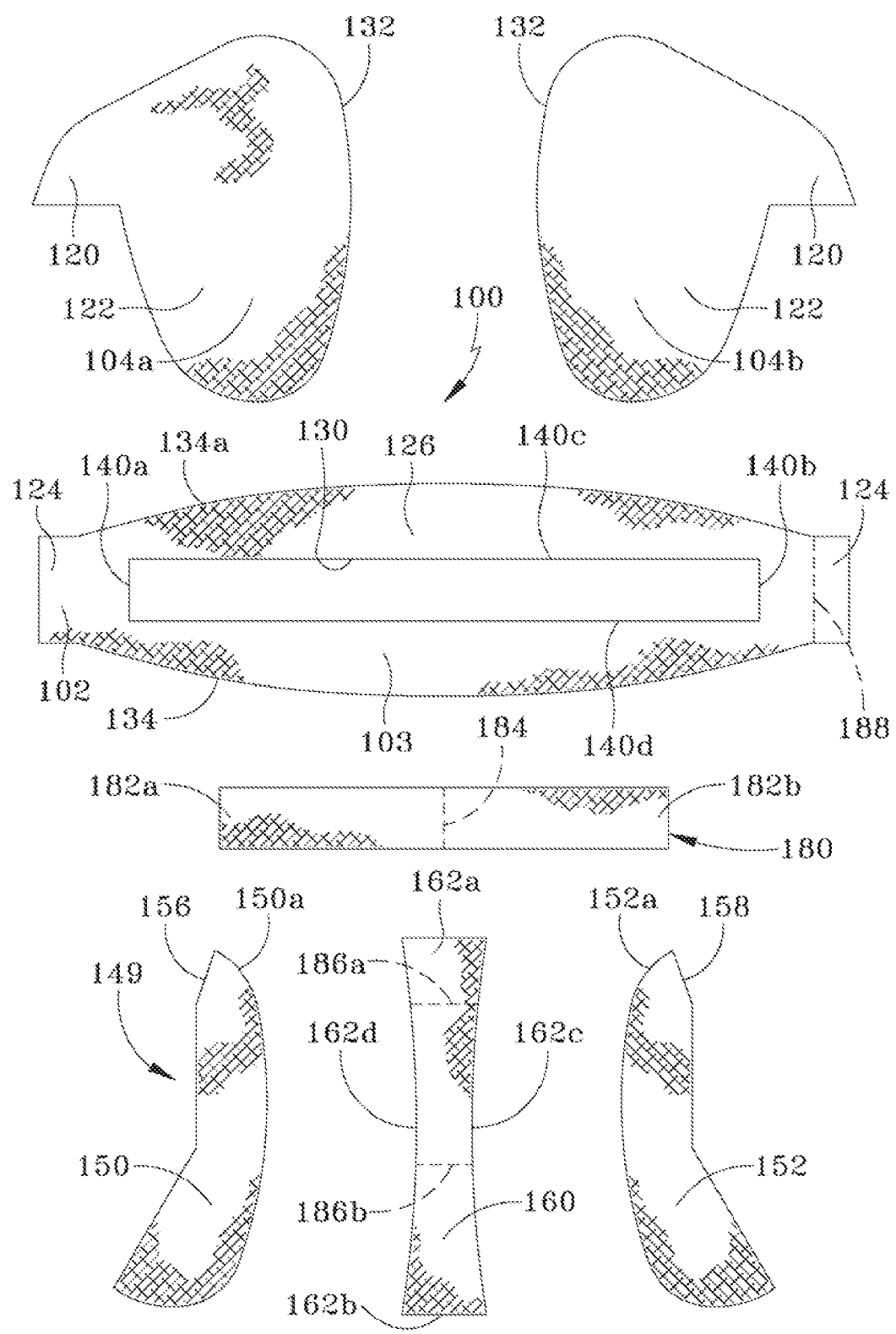
FIG. 2 is a view of the various air bag components of the air bag of FIG. 1 shown prior to being sewn together.

With reference to FIGS. 1 and 2, the air bag 100 includes a concavely shaped groove, cup or trough-shaped structure 149 (that can be formed using one or multiple panels such as panels 150, 152, 160) of fabric fitted within the opening 130 (or 130a) and sewn or otherwise secured to the edges 140a-140d of the main panel opening 130. The groove, cup or trough-shaped structure 149 is located within the air bag below the exterior surface of the main panel and is used, in cooperation with a tether and other panels of fabric, to create a groove or recess 110 between opposing lobe portions 112a, 112b of this single chambered air bag. This cup or trough-shaped structure 149 can be formed by providing a shaped, single panel or by sewing one or more panels of fabric to the edges 140a-140d of the opening 130.

In the embodiment illustrated in FIG. 2, the air bag 100 includes a left recess panel 150 and a right recess panel 152. An edge 150a of the left recess panel 150 is sewn to an edge 140d of the opening 130 in the main panel, while an edge 152a of the right recess panel 152 is sewn to another edge 140c of the opening 130 in main panel 102. Both the left recess panel 150 and right recess panel 152 further include a respective side edge 156, 158 opposite edges 150a, 152a. When the side panels 150, 152 are sewn to the edges of the opening 130 of the main panel 102, they begin to provide depth to the opening 130, as well as to openings 130a, 130b. The air bag 100 further includes a center recess panel 160 having edges 162a, 162b, 162c, and 162d. In general, the center recess panel will follow the shape of the opening in the main panel however, the center recess panel can differ in shape from the opening on the main panel, which can narrow or enlarge the front-to-rear taper of the groove. An edge 162d of the center recess panel is sewn to an edge 156 of the left recess panel 150, while another edge 162c of the center recess panel is sewn to edge 158 of the right recess panel 152. An edge 162a of the center recess panel is sewn to an edge 140a of the opening in the main panel, and another edge 162b of the center recess panel is sewn to an edge 140b of the opening in the main panel. As can be seen the panels 150, 152, 160 form the cup or trough-shaped or concave structure 149. Further, the concave shape of structure 149 can be formed, for example, by creating pleats 163 properly positioned about a flat piece of fabric 165, as shown in FIG. 6.

If the structure 149, including the three recess panels 150, 152, 160, after being sewn to the main panel 102, is pushed rearward through the opening 130 in the main panel, a recess or groove 110 is formed. However, if the motion of one or more of the panels 150, 152, 160 is not restrained as the air bag inflates, the recessed structure 149, upon inflation of the air bag, will balloon outwardly in front of the main panel. To prevent this ballooning, the air bag 100 includes one or more tethers 180 connected to one or more of the panels 150, 152 or 160. FIG. 2 illustrates one such tether. The tether 180 is a panel of material that includes opposed edges 182a, 182b and an intermediate point or region 184, which effectively divides the tether into two parts (these two parts can be realized by separate pieces of fabric). The tether 180 needs to be appropriately secured. The tether can be secured to a portion of the module 300 such as a housing 306 or to the main panel 102 proximate the lower neck 124 portion or both.

Reference is again made to FIGS. 1, 2 and 3, which illustrate the placement and location of the tether 180 in relation to the other panels forming the air bag 100. FIG. 2 illustrates, in regard to panel 160, dotted lines 186a, 186b, which represent the connection line or seam at which edges or ends 182a, 182b of the tether 180 are respectively sewn to the recess center panel 160. FIG. 3 also has another dotted line 188 to which the intermediate line or section 184 of the tether 180 is sewn or otherwise connected. Upon inflation of the air bag, the tether 180 is stressed preventing the center recess panel 160, or in general the center of the structure 149, from moving outwardly relative to the lobe portions 112a, 112b of the air bag. As mentioned, the tethered structure 149 creates the groove or space 110 between these lobe portions 112a, 112b and permits the lobe portions 112a, 112b to inflate as shown in FIGS. 1 and 1A. FIG. 1A shows the typical inflated shape of air bag 100. In FIG. 1A, the air bag 100 is configured as part of the top-mount air bag module 300. The module 300 is placed, in a known manner, at or under the top surface of an instrument panel 302. Upon inflation of the air bag the module's cover (not shown) is forced open and the air bag inflates upwardly toward the windshield 304 and forwardly toward the seated vehicle occupant. In FIG. 1A the vehicle occupant is not shown, however, the vehicle seat 24 and seat back 26 are shown. The lobe portions 112a, 112b are clearly shown. FIG. 1B is a top view of air bag 100 inflated relative to a seated occupant showing the lobes 112a and 112b of this single chambered air bag avoiding a direct impact with the head of the occupant while contacting the occupant's torso and shoulders.

As the air bag 100 initially deploys outwardly during the dynamic event of the inflation, the spacing between the inflating lobe portions 112a, 112b might increase in size greater than the steady state spacing. FIG. 5 shows a patch 400, preferably made of the same fabric as the air bag, located on the face portion 103 of the main panel 102, which joins the two lobe portions 112a, 112b and serves to limit the spacing of the lobe portions during and after inflation. The material chosen for the patch, instead of being air bag fabric, could for example be a length of woven seat belt webbing or any material capable of absorbing a tensile load. In one embodiment a patch 400a joins the tops of both lobe portions and is shown in phantom line and, with the air bag inflated, will in general extend horizontally between the lobe portions and can also be useful in cushioning the occupant's head if so contacted. In the preferred embodiment the patch 400 joins opposing middle parts of the lobe portions. In general the lower patch 400 is positioned to be below the chest of a 6-year-old vehicle occupant when seated in an out-of-position location with his chest on the cover of the air bag module, as well as below the neck of the normally seated $50^{th}$ percentile adult vehicle occupant.

Figure 2A:
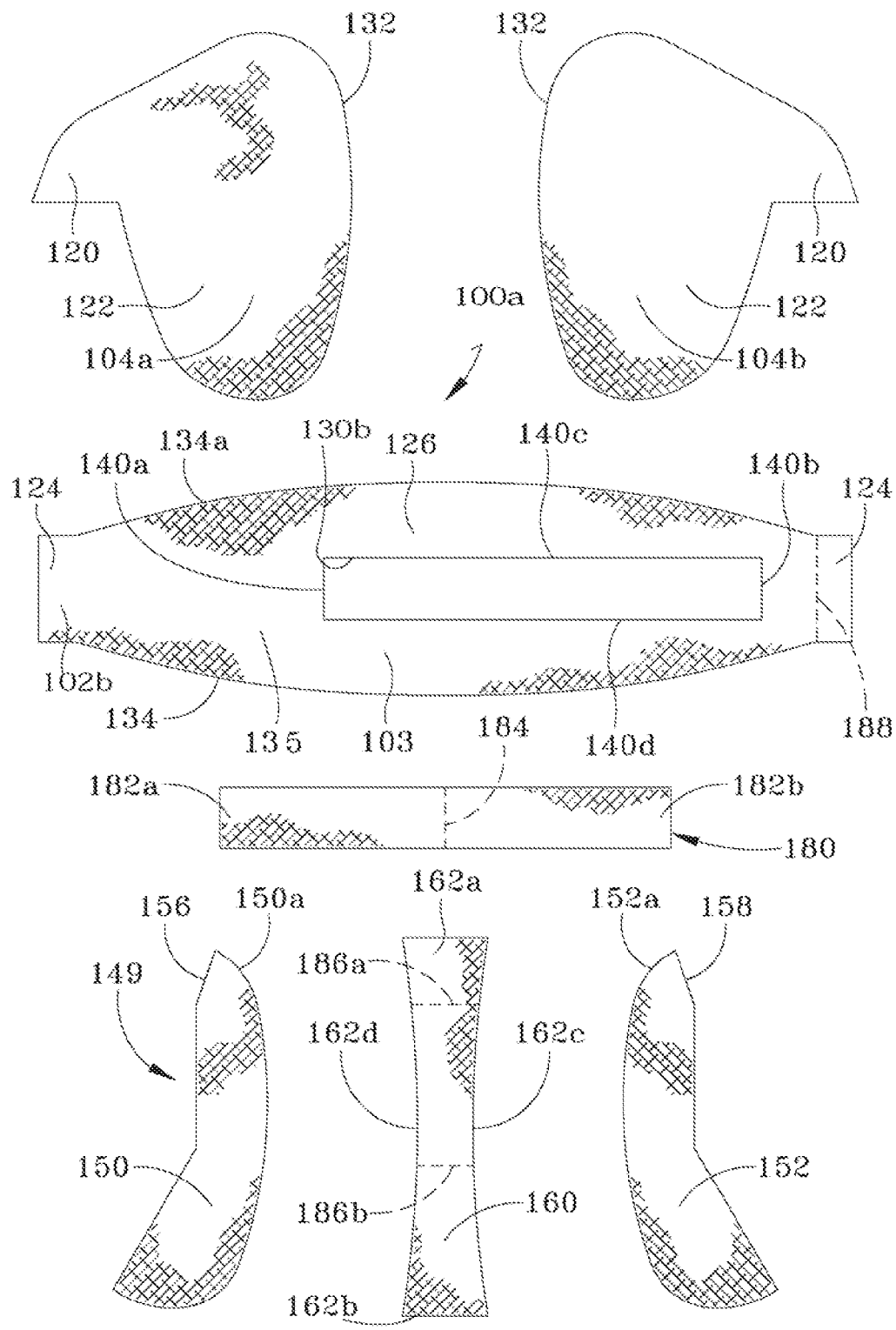
FIG. 2A shows another embodiment of the invention.
Figure 2B:
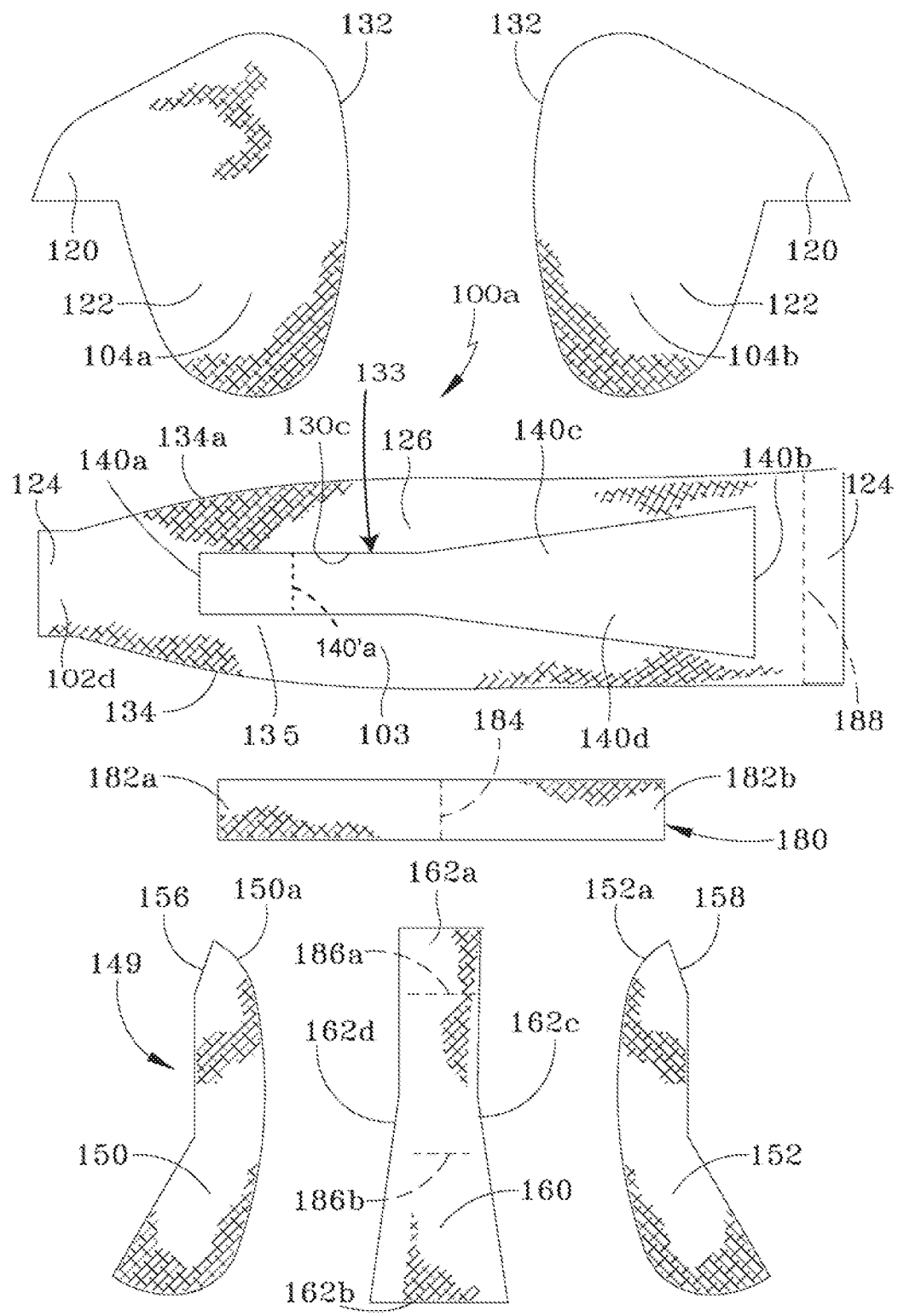
FIG. 2B shows the layout of panels useful for the embodiment shown in FIG. 4B (as well as in FIG. 4A).

Reference is made to FIGS. 1C, 1D, 1E and 2A, which illustrate an alternate embodiment including another single chambered air bag 100a that includes many of the features of the air bag 100 of FIGS. 1, 1A and 2. The main panel 102b, see FIG. 2A, is substantially identical to main panel 102 of FIG. 2 with the exception opening 130b is smaller than opening 130; the other panels in FIG. 2A are the same as those in FIG. 2. In effect, end or side 140a has been moved toward the center of panel 102b foreshortening opening 130b. The remaining panels forming the sides 104a and 104b of the air bag and the groove 110 are substantially identical to the panels used in air bag 100.

Upon constructing air bag 100a using the same technique as would be used to form air bag 100, the upper portion 135 of main panel 102b forms a bridge having an unsupported span across the upper portions 110a of recess 110. In essence the upper portions of the lobes of the inflated air bag do not provide for immediate support for the upper portion 135 of the main panel and can be seen in FIGS. 1C and 1E, which are isometric views showing air bag 100a in an inflated state.

An optional diffuser panel or element 160 is shown. The diffuser element 160 as shown in FIG. 1C can also be used in the embodiment of FIG. 1 and can be formed by a separate fabric panel or component; but alternatively, the diffuser element 160 may be an integral part of or extension of tether 180. In either form the diffuser element 160 provides a means for deflecting the flow of inflation gases entering the air bag from the inflator laterally towards the side panels as the air bag is unfolding. As a direct result of the position of the diffuser element 160, the gas flow is not in a direct normal or straight-line flow pattern. The inflation gas follows a path that is first laterally directed toward either side of the air bag 100*a* and then moves forward, which helps slow the deployment rate and the forward thrust of the air bag 100*b* as it is deploying.

The upper portion 135 of the main panel 102*a* is located to interact with the head of an occupant during a frontal crash (see FIGS. 1C, 1E and 1D). During the crash, and as the air bag inflates, the occupant will impact the upper portion 135, which as mentioned above operates as a bridge across the upper portion of groove 110 and effectively spans the opposing lobes 112*a* and 112*b* of the air bag. Further, since the upper portion 135 of the main panel 102*b* is not directly supported from behind and free-spans across the opposing lobes 112*a* and 112*b* when the upper portion 135 is loaded by the occupant during a crash, the upper portion 135 is sufficiently resilient to support the occupant while absorbing the energy of the crash and provides proper support to lessen the deceleration of the head during the crash event. Testing has shown head accelerations during a 25 mph crash for a 50th percentile unbelted male occupant (dummy) to be less than an HIC of 300 (compared with an HIC of 700 in Federal regulations). Further, as the occupant loads the upper portion 135, this loading force pulls the opposing lobes together (see arrows 137 in FIG. 1D) drawing the lobes closer to provide superior support for the occupant's chest and shoulders during the crash.

Each of the above embodiments additionally shows benefits in protecting the out-of-position occupant as well as the small child. If the out-of-position occupant impacts only one of the lobes of the air bag, then as the accident progresses, the compression of the one lobe forces inflation gas through the single chambered air bag into the main chamber and to the opposing lobe, providing a resilient cushion to the occupant. This action lessens the forces exerted on the out-of-position occupant, especially in comparison with a system having two separate air bags.

FIG. 1E shows a further embodiment of the invention in which a vent opening 139 is included in side panel 104*a* and/or 104*b*.

Figure 7:
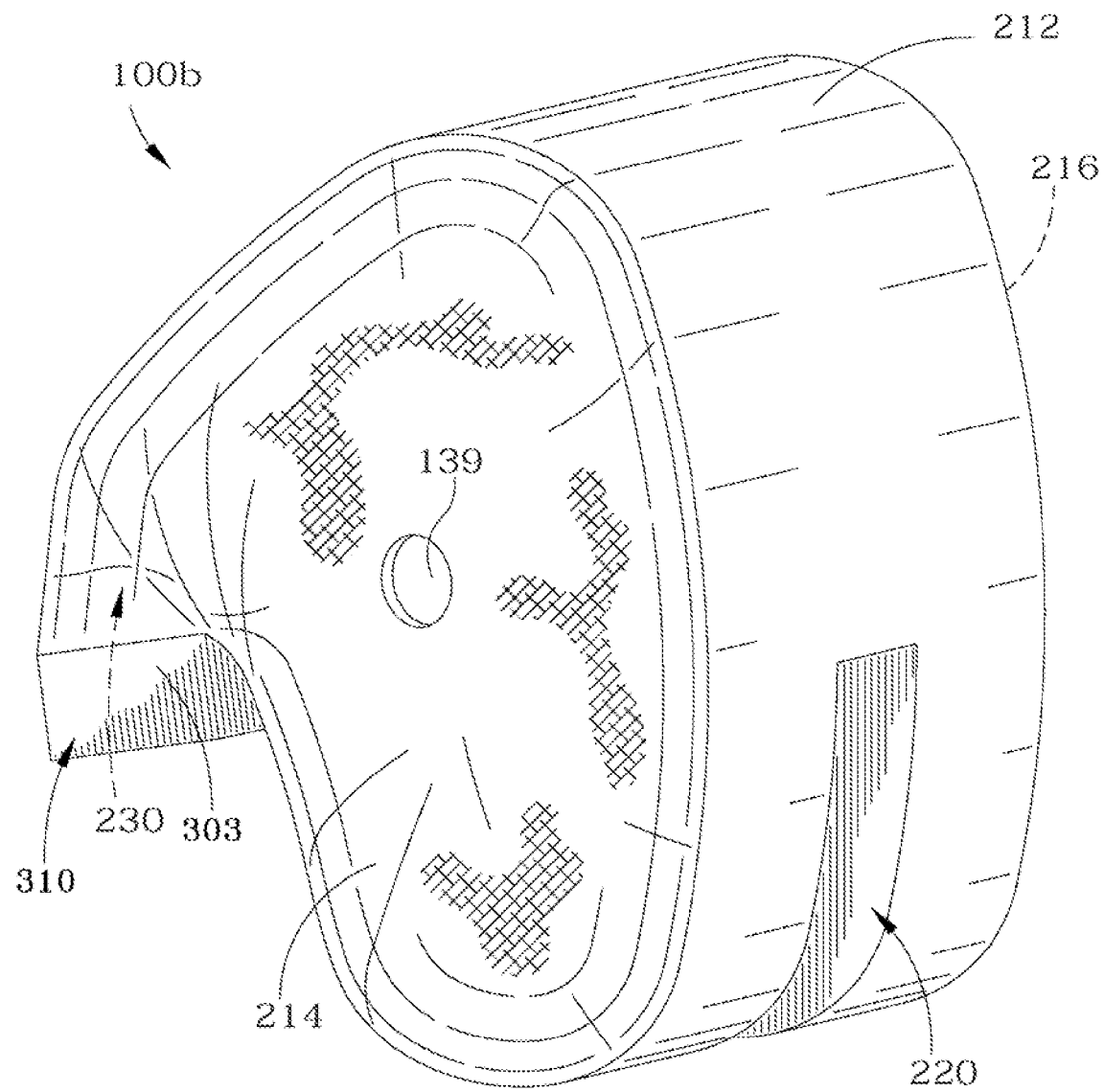
FIG. 7 is perspective view of an air bag according to another embodiment of the present invention shown in a deployed and inflated condition.
Figure 8:
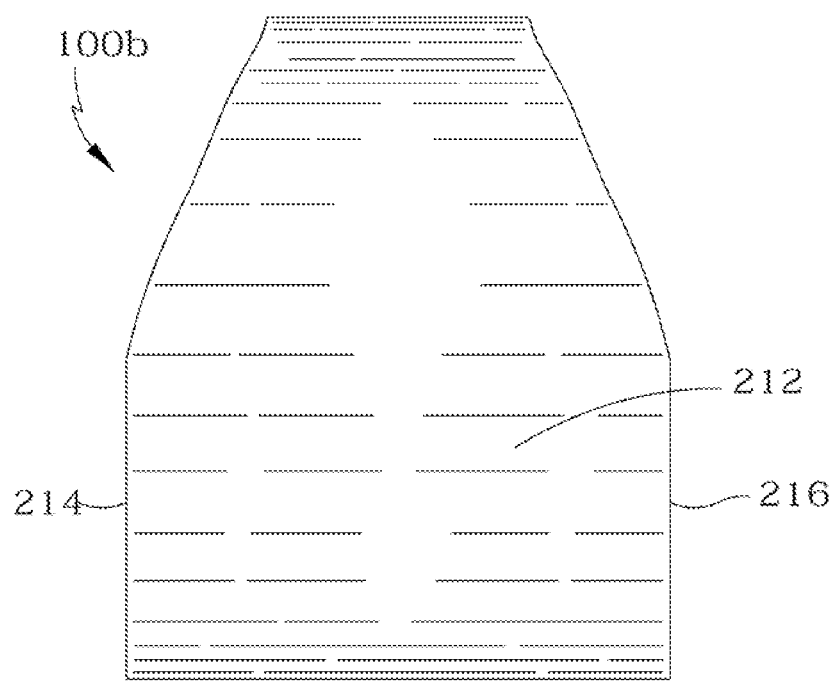
FIG. 8 is a top view looking down at the air bag of FIG. 7.
Figure 9:
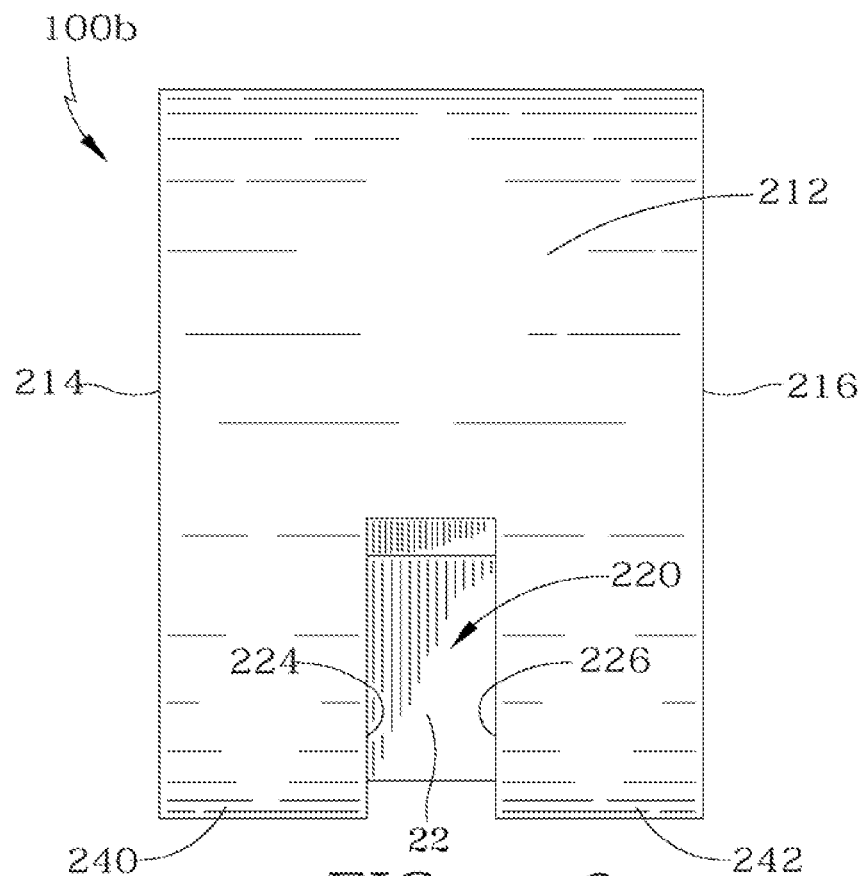
FIG. 9 is a front view of the air bag of FIG. 7.

With reference to FIGS. 7 through 12H, another embodiment of the invention is shown. As previously mentioned, the groove 110*a* of this embodiment is located lower than that shown in FIGS. 1-6. Shown in FIG. 7 is an air bag 100*b* that has a main panel 212 and two side panels 214, 216; the shape and size of the sides panels and the main panel are substantially the same as in the embodiment in FIG. 1. The main panel 212 has a top portion, a front portion and a bottom portion and, as shown in FIG. 11A, can be made from a single panel of air bag fabric. The combination of the main panel 212 and side panels 214, 216 defines a single inflatable chamber 301. The inflatable chamber 301 has an opening formed by the ends or neck portions of the main panel cooperating with the side panels to create a passageway or neck 230 that allows inflation gas to enter the inflatable chamber 301 and inflate the air bag 100*b*. With further reference to FIG. 7, a recessed or grooved portion 220 of the air bag is shown. The recessed portion 220 illustrated in this embodiment has a center recess panel 222, a left recess panel 224 and a right recess panel 226 (similar in function to panels 150, 152 and 160 though shaped differently), the combination of which forms a recessed portion 220 within the main panel 212. The term "recess" as used herein means a concavity in the surface, such as an enclosure that is set back or indented. As further shown, this recessed portion 220 divides the bag 100*b* into two lower lobe portions 240, 242 (similar to lobes 112*a* and 112*b* though positioned differently). The lower lobe portions 240, 242 are spaced apart by the recessed or grooved portion 220 in an amount sufficient to allow each lobe portion to act somewhat independently upon inflation. As shown in FIG. 9 the lobe portions 240, 242 are preferably in the front and lower portions of the main panel 212 when the air bag is in a fully deployed state and are fully open to form a part of the single inflatable chamber 301.

With reference to FIGS. 10 and 11 the air bag 100*b*, in a deployed condition, is shown with one or both side panels 214, 216 partially removed or completely removed so that the inflatable chamber 301 of the air bag 100*b* can be more easily observed. In the interior of the air bag 100*b*, the center recessed panel 222 of the recessed portion 220 is connected to a tether 250. The tether 250 extends towards the gas inlet passageway 30. The gas inlet passageway 230 is designed to mate with and be attached to an air bag module housing 306 adapted to house both the air bag 100*c* and an inflator 308 to form an air bag module assembly 310 such that when a crash is sensed by a crash sensor and an actuating signal is sent to the inflator 308, the inflator provides gases that inflate and propel the air bag 100*c* outwardly from the instrument panel of the vehicle. The air bag 100*b* near the gas inlet passageway 30 has an end anchored or otherwise attached to the module housing 303 or other means for securing the air bag. As shown, the forward movement of the recessed portion 220 is limited by the tether 250. Preferably, a second tether or one long tether portion 252 is provided that further restrains the upward movement and forward movement of the air bag 100*b* in such a fashion that both the upper portion of the air bag 100*b* and the lower portion of the air bag 100*b* are restrained from excess forward movement by the tethers. When the term "forward" is used herein and in the claims with respect to the deployment of an air bag it is understood to mean a direction toward a vehicle occupant.

An optional diffuser panel or element 260 is shown in FIG. 1C. The diffuser element 260 as shown in FIGS. 7 and 11H is a separate fabric component; but alternatively the diffuser element 260 may be an integral part of one or both of the tethers 250, 252. In either form the diffuser element 260 provides a means for deflecting the flow of inflation gases entering the air bag from the inflator laterally towards the side panels 214, 216 as the air bag is unfolding. As a direct result of the position of the diffuser element 260, the gas flow is not in a direct normal or straight-line flow pattern. The inflation gas follows a path that is first laterally directed toward either side of the air bag 100*b* and then moves forward, which helps slow the deployment rate and the forward thrust of the air bag 100*b* as it is deploying.

An important aspect of this embodiment of the present invention is that the recessed portion or groove 220 is located only at a lower portion of the deployed air bag extending vertically generally from somewhat above the middle of the front portion of the main panel 212 to the bottom portion of the main panel 212. As shown, the recessed or grooved portion 220 is located at or below the location of the gas inlet passageway 230 relative to a horizontal plane passing through the gas inlet passageway when the air bag is in a deployed state. As shown, the gas inlet passageway 230 has the inflation gas moving in an upward direction and then deflected by the diffuser element 260. The recessed portion 220, being attached by the tether 250, moves outwardly as the air bag 100*b* is deployed to a point at which the tether 250 becomes taut. At such a point the recessed portion 220 can no longer extend forward towards the vehicle occupant; however, the side lobe portions 240, 242 continue to develop and inflate and they can absorb the energy impact of the vehicle occupant as the vehicle occupant is moving forward during a vehicle crash. Preferably one or more vents or openings 139 are strategically positioned on each side of the air bag 100b to facilitate deflation of the air bag after deployment and interaction with the vehicle occupant. Each vent or opening 139 as shown is sufficiently sized to permit a release of the contained gases inside the inflated air bag. As shown, these vent openings 139 are located in an upper portion on each side panel about midway between the inlet passage 230 and the front portion 212 and above each lobe portion 240, 242.

Interestingly, the lower lobe portions 240, 242 provide a lower force cushioning effect that is less severe than the top portion of the air bag 100b in that each lobe portion 240, 242 is free to move and deflect inwardly, both laterally on the side as well as internally relative to the recessed portion 220. Therefore, an out-of-position vehicle occupant would compress or depress one lobe portion possibly more than the other lobe portion, but due to the nature of the single inflatable chamber 301 being fully open to that portion created within the lobe portion, an easy deflection of this portion is possible such that a small child or infant will not receive a full impact of a conventional air bag upon deployment, as is also the case with the embodiment in FIG. 4B. This is true because the lobe portions 240, 242 are free to deflect in both directions laterally and also rearwardly back towards the instrument panel. The advantage of this is simple: the air bag geometry is such that a small child or out-of-position child or a passenger seated close to the air bag will be struck by one or both of the lobe portions 240, 242 and the lobe portions being easily deflected reduces the amount of force applied to the vehicle occupant to greatly reduce the risk of injury. Assuming the vehicle occupant is perfectly centered, then portions of both lobe portions 240, 242 can make contact as well as the recessed portion 220, which is restrained by the tether 250 as the air bag 100b inflates and prior to reaching a fully inflated state.

What is particularly advantageous with the present geometry of the disclosed air bags is that the air bag geometry itself provides a low deployment force directed at the vehicle occupant at the lower portion of the air bag where children and infants are most vulnerable. In this embodiment the upper portion of the air bag 100b, beyond the recessed portion 220, provides a more conventional single-faceted air bag, which is more than capable of providing sufficient cushioning for a passenger that is an adult vehicle occupant. The air bag structure of each embodiment provides good performance when inflated with a single-stage inflator, many examples of which are well known to those of ordinary skill in the field of vehicle occupant safety restraints. This has a tremendous advantage in improving the reliability of such air bag systems. Nevertheless, these air bags are functional with more advanced dual-stage pyrotechnic and hybrid inflators and not limited to use with single stage inflators.

The new regulation criteria requiring that air bags be suitable for a generic family of vehicle occupant sizes means that either the systems become far more complex or alternatively the systems have sensors that will prevent deployment of the air bag. Each of the embodiments as illustrated satisfies all these requirements without requiring shutting off the air bag under certain circumstances. This has a tremendous advantage in that under all conditions including slow speed crashes at 40 kilometers per hour (25 miles per hour) or less, the vehicle occupants can be safely cushioned by the air bag without the risk of having a high inflation force propelled into the vehicle occupant, which in itself could cause injury.

With reference to FIGS. 11A through 11H, each of the components or panels used to make the air bag of the present invention is illustrated. These panels are generally similar in shape and size to the panels shown in FIGS. 2-2B and are also made of woven air bag fabric of nylon or polyester. The main panel 212 forms a top, a bottom and a front portion of the air bag 100b. The main panel 212 has a symmetrical configuration wherein both ends 230a, 230b neck or narrow down to provide a portion of the gas inlet passageway 230. As shown there is an opening 211 that is surrounded by edges 212a, 212c, 212b and 212c of the opposite side. As shown the opening 211 is rectangular in shape.

Figure 12B:
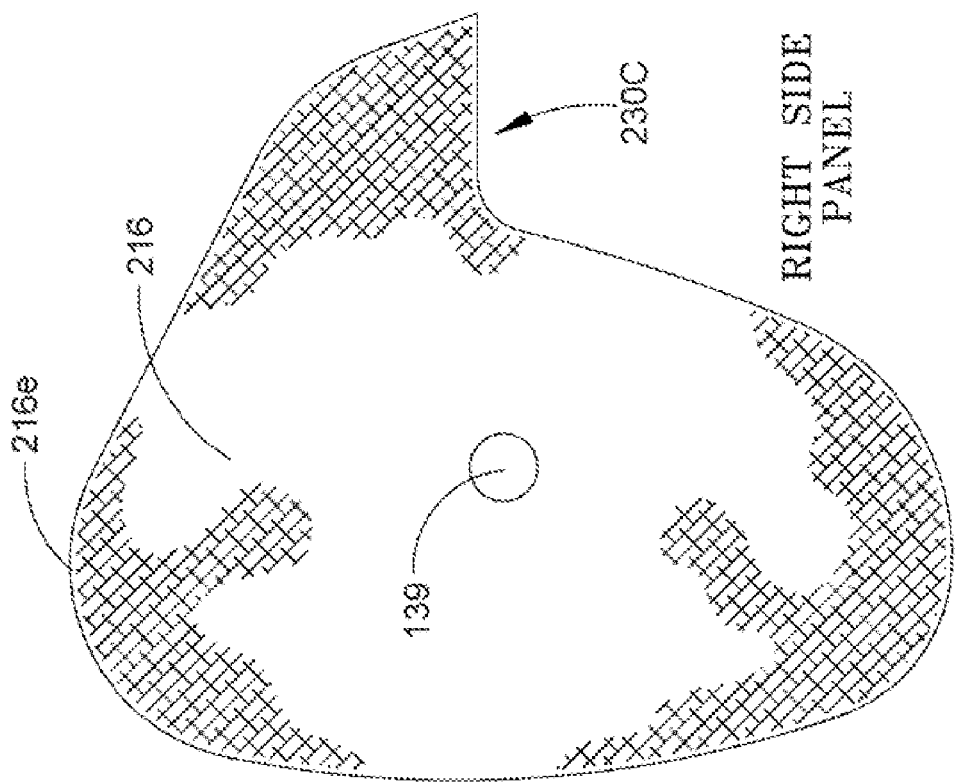
Figure 13:
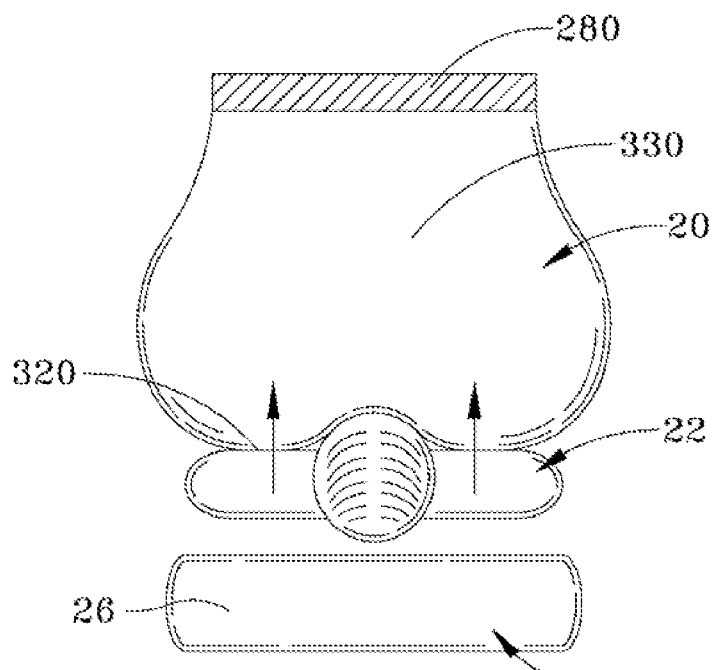
FIG. 13 is a top view of one type of prior art passenger air bag.
Figure 14:
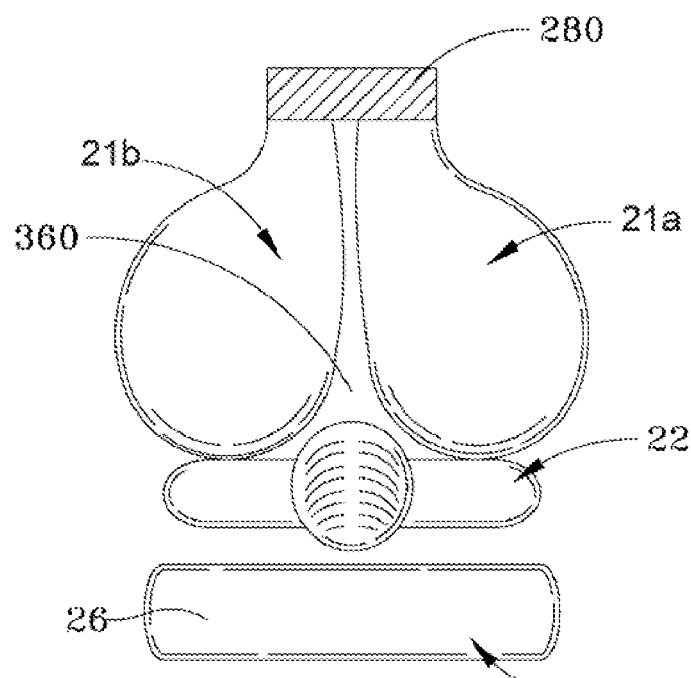
FIG. 14 is a top view of another type of prior art passenger air bag.

With reference to FIG. 11B, the side panels 214, 216 for the left and right sides of the air bag are shown. The side panel 214 is for the left-hand side of the air bag whereas the right-hand side of the air bag 216 is illustrated being a mirror image of the side panel 214. Each of the panels 214, 216 has a neck portion 230d, 230c to provide a portion of the gas inlet passageway 230. Vent 139 can be provided as shown in FIGS. 11B and 12B on each side panel 214, 216. The edges 214e, 216e of the side panels are attached to the front main panel along the lateral edges 212e of the main panel. The edges of these panels can be sewn or otherwise affixed to one another to make the inflatable chamber 301 previously discussed. The opening 211 in the main panel has been provided with a right-hand recess panel and a left-hand recess panel 226, 224 respectively. The right and left-hand recess panels 224, 226 are sewn along their curved edges 224c, 226c to edge 212c of the opening 211 in the main panel. Once sewn to each side 212c of the rectangular opening 211 as illustrated, the side recess panels 224, 26 are then sewn at their straight edges 224d, 226d to the center recess panel 222 along edges 222d of the center recess panel. Once this is accomplished, the recessed portion 220 has a pocket, cup or trough-shaped form similar to that shown in the earlier embodiments that closes the entire opening 211 of the main panel 212. What in the deployed air bag will be the top and bottom edges 222a, 222b of the center recess panel 222 are sewn to the corresponding edges 212a, 212b of the opening 211 in the main panel.

With reference to FIGS. 11F and 11G, two tethers 250, 252 are provided. As shown in FIGS. 10 and 11, the tether 250 is connected to the center recess panel 222 along a sew line 222c at location 250c on the tether 250. Additionally the opposite end 250g of the tether 250 is preferably sewn or attached at or near the bottom end 230b of the main panel 212 near the passageway 230 that is formed by the assembly of the main panel 212 and the two side panels 214, 216. Preferably the tether 250 as shown is centered on the main panel 212 and sewn in that location.

With reference to FIGS. 10, 11 and 11F, the second tether 252 is shown attached to the main panel 212 at location 212f, the end 252f being sewn there. Similarly, at the opposite end 252g, the tether 252 can be attached preferably near the passageway 230. Although not shown, a tether 250, 252 can be provided with an extension that can form all or a portion of the diffuser element 260. As mentioned, the diffuser element 260 can either be an integral component of a tether 250, 252 or a separate panel. As illustrated in FIG. 11H, the diffuser element 260 can be a separate component, in which case both ends would need to be sewn to the main panel 212 traversing the passageway 230 on both sides of the main panel 212. As illustrated, the tether 252 secures the air bag 100b at an upper portion near or on the top portion of the main panel 212 such that in a fully extended position it is inclined with a slight vertical inclination and projects outwardly at about 45 degrees relative to the gas inlet passageway 230. This provides a restraint of the upward movement of the air bag. As shown, the lower tether 250 projects outwardly either horizontally or preferably slightly below the gas inlet passageway 230 and as shown is attached to the center recess panel 222, which holds the recessed portion 220 in an open position so that upon inflation the recessed portion 220 maintains its open recessed shape relative to the inflatable chamber 301.

An alternative embodiment of the present invention is shown in FIGS. 12A through 12H. In FIGS. 12A through 12H the embodiment is substantially identical to that as shown in the FIGS. 7 through 11H. The difference occurs in that FIGS. 12D and 12E have the right and left recess panels 225, 223 having a curved side 223c, 225c, with the ends of the curved side connected by a single straight side 223d, 225d such that the outer contour of the air bag is maintained in a curvilinear fashion as previously shown; however, the recessed portion 220 initiates at a point in both locations as opposed to having a deepened flat upper portion as shown in the first embodiment. Otherwise the assembly and locations are generally the same with the exception that in this embodiment the tether 250 should be attached preferably at the location 222c to the lower portion of the recess along the lower corner at the location where the side recess panels 223, 225 intersect the main panel 212. In this fashion the recessed portion 220 is held in the open position at generally one end of the semicircular recess panels 223, 225.

As shown, the air bag 100b of the present invention can be modified in such a fashion that the recessed portion 220 as formed can have a more complex configuration; however, it is important to note that the recessed portion 222 should be tethered such that forward movement of the recessed portion is restrained and that the lobe portions 240, 242 can independently react to interact with a vehicle occupant in such a fashion that the air bag can easily deform and collapse in that region in such a fashion that the vehicle occupant will not be taking the full force of the deploying air bag 100b in the lower portion, as would be the case in the upper portion of the air bag striking an adult vehicle occupant. As shown, the center recess panel 222 and the opening 211 are rectangular and of similar width. Alternatively, the center recess panel can be made wider or narrower in width relative to the opening 211 such that the side panels are inclined, making tapered side walls of the recessed portion 220. Similarly the recess center panel 222 and the opening 211 can be oval or trapezoidal in shape or preferably larger at the bottom of the recessed portion 220 and narrower as the recessed portion 220 extends toward the upper portions. All of these refinements are considered within the scope of the present invention.

As noted, the air bag 100b has at least one tether attached to the center recess panel 222 at a location about halfway between the upper and lower ends 222a, 222b. The length of the upper tether 252 is greater than or equal to the sum of the length of the tether 250 attached to the center recess panel 222 and the distance from the location where the tether 250 is attached to the center recess panel 222 to the main panel 212 extending along the side recess panels 224, 226 or 223, 225. The recess portion or groove 220 preferably has a width in the inflated air bag of at least 25% of the width of the front portion of the main panel 212, preferably between 25% and 35% of the overall width; in general this may be about 150-250 mm. The overall length of the recess can be varied between 40% and 65% of the overall air bag height. The recessed portion 222 has a maximum depth as measured along one of the side recess panels at or below a vertical point along the side recess panel. The maximum depth preferably is at least equal to or greater than the width of the recessed portion 222. A typical groove or received portion may have a depth in the range of 120-250 mm.

An exemplary air bag 100b according to the present invention that was manufactured and tested had an overall width of 500 mm and an overall height of 650 mm with a 250 mm long recess 220 having a width of 120 mm and a depth ranging from 180 mm at the top of the recess to 235 mm at the bottom. This exemplary air bag was deployed using an inflator of the type shown in FIG. 15. This exemplary inflator is disclosed in commonly owned U.S. patent application Ser. No. 11/241,222 filed 3 Oct. 2005, which is incorporated fully herein for the purpose of disclosing an inflator that may be used in an air bag module according to the present invention. The exemplary inflator 505 has an inflator housing 511 filled with a pressurized medium containing an inert gas 506 and one or more heaters 501, 502 internal and connected at an end of said inflator housing 511.

At least one of the gas heaters 501, 502 has an outer shell defining the heater housing 501a having a plurality of heater holes 560, a gas generating chamber 507 in which a generant charge 527 is stored, said gas generating chamber 507 and said inflator housing 511 being in communication with each other through said plurality of holes 560, an ignition means 503 connected to said gas heater 502 and located at an end of said inflator housing 511, and an enhancer chamber 504, in which an enhancer charge is stored is disposed between the ignition means 503 and the gas heater 501, 502. The enhancer chamber 504 is located between the gas generating chamber 507 and said ignition means 503 and is separated from said gas generating chamber 507 by a bulkhead 540. The bulkhead 540 has one or more first openings 542 leading to said gas-generating chamber 507. Gas exits the inflator through passageways 561 in the inflator housing 511, then passes through the opening in the air bag to enter the inflatable chamber. This exemplary inflator 505 is a multistage type hybrid inflator that was successfully used in an evaluation test of an air bag 100b according to the present invention.

As shown in FIGS. 11A-11G and 12A-12G, the air bag panels may be separate fabric components that are attached, connected or sewn together along edges. Alternatively, the fabric can be made by knitting or possibly weaving wherein the individual components are formed simultaneously or as a unitary knitted structure. In such a case the present invention is equally applicable as this form of structure will have a top, front, bottom and sides with a vertically extending recessed portion 222 on the lower portion of the air bag 100b, similar if not identical to the sewn panel type air bag.

An air bag according to the present invention may be a part of an air bag module 300 having a module housing 303, an inflator 308 inside the module housing 303, and the air bag 100b according to the present invention is attached to the module housing 303 and may be folded inside the module 300.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. An air bag assembly (100a) comprising:
  a single inflatable chamber (101) having sides and a face portion;
  a groove, indent or recess (110), formed in the face portion, separating adjacent portions of the air bag into opposite inflatable lobes, an upper section of the face portion extends between a respective upper part of each lobe, the upper section, upon inflation of the air bag, facing in a direction of an occupant to be protected;

wherein a top portion of the groove extends under and behind the upper section relative to the occupant and wherein a lower portion of the groove extends downwardly relative to the upper section.

2. An air bag assembly (100*a*) comprising:
a single inflatable chamber (101) having sides and a face portion, wherein no additional material crosses over the face portion;
a groove, indent or recess (110), formed in the face portion, separating adjacent portions of the air bag into opposite inflatable lobes;
wherein a top portion of the groove is located under an adjacent part of the face portion which bridges over a top portion of the groove;
wherein at least one tether is internal to the air bag, and at least one end is connected to the groove for limiting movement of the material forming the groove.

3. An air bag assembly (100*a*) comprising:
a single inflatable chamber (101) having sides and a face portion, the face portion formed by a single material panel;
a groove, indent or recess (110) formed in the face portion separating adjacent portions of the air bag into opposite inflatable lobes, the groove, indent or recess extending generally vertically across the face portion when the air bag is inflated;
the air bag configured so that only a top portion of the groove is bridged by one of the material panel and another piece of material which is other than the single material panel, the material panel having ends operatively part of each lobe;
wherein a tether is secured to various portions of material forming the groove as well as secured to a generally fixed portion of a housing or to a portion of the air bag and wherein the tether is disposed generally behind a rear portion of the groove, indent or recess.

4. The air bag assembly according to claim 1 wherein multiple cross-sections through the groove are each one of rectangular, oval or trapezoidal in shape.

5. An air bag assembly (100*a*) comprising:
a single inflatable chamber (101) formed by a main panel and pair of side panels integral to or otherwise attached along mating edges wherein the main panel has a top portion, a front portion and a bottom portion and the inflatable chamber has a gas inlet passageway anchored at an end for allowing inflation gases to enter to fill the inflatable chamber;
a vertically oriented recessed portion or groove formed on a forward facing portion of the air bag, the main panel covering a top region of the recessed portion, the recessed portion dividing the inflatable chamber into two lobe portions (112*a*, 112*b*); and
at least one internal tether having one end attached to the recessed portion and a second end which is also anchored thereby limiting forward movement of the recessed portion upon inflation of the inflatable chamber;
further comprising a second upper internal tether attached to the top portion of the main panel and anchored proximate the gas inlet passageway thereby limiting forward movement of an upper portion of the inflatable chamber.

6. The air bag of claim 5 further comprising an internal diffuser element (160), the diffuser element spanning across the gas inlet passageway to redirect incoming inflation gases toward each side panel.

7. The air bag of claim 5 wherein the at least one tether is attached to the center recess panel at least two locations.

8. The air bag of claim 7 wherein the length of the upper tether is greater than or equal to the sum of the length of the tether attached to the center recess panel and the distance from the location the tether is attached to the center recess panel to the main panel extending along the side panels.

9. A method of forming an air bag, the air bag of the type having:
a single inflatable chamber (101) having sides and a face portion;
a groove, indent or recess (110) formed in the face portion of the single inflatable chamber, the groove, indent or recess separating adjacent portions of the air bag into opposite inflatable lobes;
the air bag configured so that a top portion of the groove, indent or recess is covered by and spanned by a niece of material, the material having ends operatively part of each lobe, the method including the steps of a) forming the inflatable chamber, b) forming the recess, groove or indent in the face portion of the air bag, and covering and spanning the top portion of the groove, indent or recess with the material; and
including a step of securing a tether to portions of the material forming the groove.

10. The method of claim 9 including the step of forming the groove into one of a three-dimensional rectangular, oval or trapezoidal shape.

11. An air bag assembly (100*a*) comprising:
a single inflatable chamber (101) having sides and a face portion, wherein no additional material crosses over the face portion;
a groove, indent or recess (110), formed in the face portion, separating adjacent portions of the air bag into opposite inflatable lobes;
wherein a top portion of the groove is located under an adjacent part of the face portion which bridges over a top portion of the groove;
including at least two tethers, internal to the air bag, having ends connected to the groove for limiting movement of the material forming the groove.

12. An air bag assembly (100*a*) comprising:
a single inflatable chamber (101) formed by a main panel and pair of side panels integral to or otherwise attached along mating edges wherein the main panel has a top portion, a front portion and a bottom portion and the inflatable chamber has a gas inlet passageway anchored at an end for allowing inflation gases to enter to fill the inflatable chamber;
a vertically oriented recessed portion or groove formed on the front portion of the air bag, a portion of the front portion of the main panel bridging over and covering a top region of the recessed portion or groove, the recessed portion or groove dividing the inflatable chamber into two lobe portions (112*a*, 112*b*); and
at least one internal tether having one end attached to the recessed portion and a second end which is also anchored thereby limiting forward movement of the recessed portion upon inflation of the inflatable chamber;
including at least two tethers, internal to the air bag, having ends connected to the recessed portion for limiting movement of the material forming the recessed portion.

13. An air bag assembly (100*a*) comprising:
a single inflatable chamber (101) formed by a main panel and pair of side panels integral to or otherwise attached along mating edges wherein the main panel has a top portion, a front portion and a bottom portion and the inflatable chamber has a gas inlet passageway anchored at an end for allowing inflation gases to enter to fill the inflatable chamber;

a vertically oriented recessed portion or groove formed on a forward facing portion of the air bag, the main panel laterally bridging over and covering a top region of the recessed portion, the recessed portion dividing the inflatable chamber into two lobe portions (112a, 112b); and at least one internal tether aligned along a vertical direction of the recessed portion or groove having one end attached to the recessed portion and a second end which is also anchored thereby limiting forward movement of the recessed portion upon inflation of the inflatable chamber;

wherein the recessed portion extends from near a top portion of the main panel to about the bottom portion of the main panel;

including at least two tethers, internal to the air bag, having ends connected to the recessed portion for limiting movement of the material forming the recessed portion.

14. An air bag assembly (100a) comprising:

a single inflatable chamber (101) having sides and a face portion;

a groove, indent or recess (110) creating a void or space on the face portion separating adjacent portions of the air bag into opposite inflatable lobes; the groove, indent or recess having a top, middle and bottom portion; wherein the air bag is configured so that the top portion of the void or space is bridged by a piece of material, the material which bridges the groove, indent or recess being operatively part of each lobe, wherein a top portion of the groove is covered by the piece of material and is rearward of the piece of material.

15. An air bag assembly (100a) comprising:

a single inflatable chamber (101) having sides and a face portion;

a groove, indent or recess (110) a portion of which is formed in the face portion separating adjacent portions of the air bag into opposite inflatable lobes; the groove, indent or recess having a top, middle and bottom portion; wherein the air bag is configured so that the top portion of the groove, indent or recess is bridged by a piece of material, the material which bridges the groove, indent or recess being operatively part of each lobe, the top of the groove being behind and under the niece of material.

16. An air bag assembly (100a) comprising:

a single inflatable chamber (101) having sides and a face portion facing when the air bag is inflated an occupant to be protected, wherein an additional piece of material crosses over the face portion;

a groove, indent or recess (110), formed in the face portion, separating adjacent portions of the air bag into opposite inflatable lobes;

wherein a top portion of the groove is located rearward and under the additional piece of material.

17. An airbag comprising:

a single inflatable chamber defined by a various panels integral to or otherwise attached along edges of a main panel wherein the main panel has a top portion, a front portion and a bottom portion and the inflatable chamber has a gas inlet passageway configured to receive inflation gas therethrough to fill the inflatable chamber; and at least one internal tether attached to the single inflatable chamber configured to form, in the inflatable chamber when the chamber is inflated, a groove having a component located at or near a bottom of the inflatable chamber, the groove beginning on part of the inflatable chamber configured to face an occupant and extending away from this part.

18. An airbag comprising:

a single inflatable chamber defined by a main panel and pair of side panels integral to or otherwise attached along edges of the main panel wherein the main panel has a top portion, a front portion and a bottom portion and the inflatable chamber has a gas inlet passageway anchored at an end for allowing inflation gases to enter to fill the inflatable chamber;

the chamber configured to form two small lobes with a groove therebetween when inflated, at least part of each of these lobes is located proximate a lower portion of the single chamber when inflated, the groove having a lower component located at or near a bottom of the inflatable chamber; the groove beginning on part of the inflatable chamber configured to face an occupant and extending away from this part, wherein an upper portion of each lobe is linked by a piece of material, the groove having an upper portion located underneath and rearward of the niece of material when the air bag is inflated.

* * * * *